(12) United States Patent
Woronowicz et al.

(10) Patent No.: US 9,327,602 B2
(45) Date of Patent: May 3, 2016

(54) INDUCTIVELY TRANSFERRING ELECTRIC ENERGY TO A VEHICLE USING CONSECUTIVE SEGMENTS WHICH ARE OPERATED AT THE SAME TIME

(71) Applicant: Bombardier Transportation GmbH, Berlin (DE)

(72) Inventors: Konrad Woronowicz, Kingston (CA); Robert Czainski, Szczecin (PL)

(73) Assignee: Bombardier Transportation GmbH, Berlin (DE)

( * ) Notice: Subject to any disclaimer, the term of this patent is extended or adjusted under 35 U.S.C. 154(b) by 63 days.

(21) Appl. No.: 14/357,455

(22) PCT Filed: Nov. 9, 2012

(86) PCT No.: PCT/EP2012/072271
§ 371 (c)(1),
(2) Date: May 9, 2014

(87) PCT Pub. No.: WO2013/068534
PCT Pub. Date: May 16, 2013

(65) Prior Publication Data
US 2014/0318913 A1    Oct. 30, 2014

(30) Foreign Application Priority Data

Nov. 10, 2011   (GB) .................................. 1119530.2

(51) Int. Cl.
| | |
|---|---|
| *B60M 1/10* | (2006.01) |
| *B60L 5/00* | (2006.01) |
| *B60M 7/00* | (2006.01) |

(52) U.S. Cl.
CPC ....... *B60L 5/005* (2013.01); *B60M 1/10* (2013.01); *B60M 7/003* (2013.01); *B60L 2200/26* (2013.01)

(58) Field of Classification Search
CPC ............. B60L 5/00; B60L 5/005; B60L 9/00; B60L 11/00; B60M 7/003; B60M 1/00; B60M 1/06; B60M 1/10
See application file for complete search history.

(56) References Cited

U.S. PATENT DOCUMENTS

| | | | | |
|---|---|---|---|---|
| 3,914,562 A | * | 10/1975 | Bolger | ..................... B60K 1/04 191/10 |
| 4,205,243 A | * | 5/1980 | Lingaya | ................. H02K 41/03 104/290 |

(Continued)

FOREIGN PATENT DOCUMENTS

| | | |
|---|---|---|
| CN | 102177044 A | 9/2011 |
| DE | 2656389 A1 | 6/1978 |

(Continued)

*Primary Examiner* — Jason C Smith
(74) *Attorney, Agent, or Firm* — The Webb Law Firm

(57) ABSTRACT

A system for transferring electric energy to a vehicle, including an electric conductor arrangement for producing an alternating electromagnetic field and for thereby transferring electric energy to a vehicle. The conductor arrangement includes a plurality of consecutive segments. Each segment is combined with an assigned controller adapted to control the operation of the segment independently of the other segments. The controllers of at least two consecutive segments are connected to each other and/or to a central controlling device so that the at least two consecutive segments can operate at the same time. Each segment includes at least three alternating current lines for carrying phases of a multi-phase alternating current. The consecutive segments are electrically connected in parallel to each other to a current supply. The alternating current lines of each segment include a plurality of sections which extend transversely to the direction of travel of the vehicle.

14 Claims, 16 Drawing Sheets

(56) References Cited

U.S. PATENT DOCUMENTS

| | | | | |
|---|---|---|---|---|
| 4,274,020 A * | 6/1981 | Parsch | B60L 13/00 | 104/290 |
| 4,800,328 A * | 1/1989 | Bolger | B60L 5/005 | 191/10 |
| 4,836,344 A * | 6/1989 | Bolger | B60L 5/005 | 191/10 |
| 5,174,215 A * | 12/1992 | Barrows | B60L 15/005 | 104/288 |
| 5,669,470 A * | 9/1997 | Ross | B60L 5/005 | 191/10 |
| 6,089,362 A | 7/2000 | Takasan et al. | | |
| 6,421,600 B1 * | 7/2002 | Ross | B60L 5/005 | 180/167 |
| 8,360,216 B2 * | 1/2013 | Meins | B60L 5/005 | 191/10 |
| 8,544,622 B2 | 10/2013 | Vollenwyder et al. | | |
| 2011/0163542 A1 * | 7/2011 | Farkas | B60L 11/005 | 290/2 |
| 2011/0198176 A1 * | 8/2011 | Meins | B60L 5/005 | 191/10 |
| 2011/0253495 A1 * | 10/2011 | Vollenwyder | B60L 5/005 | 191/10 |
| 2011/0259694 A1 * | 10/2011 | Matsumura | B60K 1/04 | 191/10 |
| 2011/0315496 A1 * | 12/2011 | Bohori | B60L 5/005 | 191/10 |
| 2012/0055751 A1 * | 3/2012 | Vollenwyder | B60L 5/005 | 191/10 |
| 2012/0186927 A1 * | 7/2012 | Suh | B60L 11/1803 | 191/10 |
| 2012/0261482 A1 * | 10/2012 | Vollenwyder | B60L 5/005 | 238/14.05 |
| 2012/0318625 A1 * | 12/2012 | Woronowicz | B60L 5/005 | 191/49 |
| 2012/0326498 A1 * | 12/2012 | Woronowicz | B60L 5/005 | 307/9.1 |
| 2013/0057204 A1 * | 3/2013 | Vollenwyder | B60L 5/005 | 320/108 |
| 2013/0098723 A1 * | 4/2013 | Cho | H02J 5/005 | 191/10 |
| 2013/0248311 A1 * | 9/2013 | Czainski | B60L 5/005 | 191/10 |
| 2014/0097675 A1 * | 4/2014 | Vollenwyder | B60L 5/005 | 307/9.1 |
| 2014/0174870 A1 * | 6/2014 | Niizuma | H02J 5/005 | 191/10 |
| 2014/0238804 A1 * | 8/2014 | Vietzke | B60L 5/005 | 191/10 |
| 2014/0318912 A1 * | 10/2014 | Woronowicz | B60L 5/005 | 191/10 |
| 2014/0318913 A1 * | 10/2014 | Woronowicz | B60L 5/005 | 191/10 |
| 2015/0035355 A1 * | 2/2015 | Woronowicz | B60L 5/005 | 307/9.1 |
| 2015/0075934 A1 * | 3/2015 | Czainski | H01F 27/36 | 191/10 |
| 2015/0084406 A1 * | 3/2015 | Czainski | B60L 11/182 | 307/9.1 |

FOREIGN PATENT DOCUMENTS

| | | |
|---|---|---|
| GB | 657035 | 9/1951 |
| GB | 2474867 A | 5/2011 |
| WO | 9323909 A1 | 11/1993 |
| WO | 2010031593 A2 | 3/2010 |

* cited by examiner

INDUCTIVELY TRANSFERRING ELECTRIC ENERGY TO A VEHICLE USING CONSECUTIVE SEGMENTS WHICH ARE OPERATED AT THE SAME TIME

CROSS-REFERENCE TO RELATED APPLICATIONS

This application is the United States national phase of International Application No. PCT/EP2012/072271 filed Nov. 9, 2012, and claims priority to Great Britain Patent Application No. 1119530.2 filed Nov. 10, 2011, the disclosures of which are hereby incorporated in their entirety by reference.

BACKGROUND OF THE INVENTION

1. Field of the Invention

The invention relates to the transfer of electric energy to a vehicle, in particular to a track bound vehicle such as a light rail vehicle (e.g. a tram) or to a road automobile such as a bus.

2. Description of Related Art

The invention also relates to a corresponding method of manufacturing the system and to a corresponding method of operating the system.

Track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to a system for transferring electric energy to a vehicle which is not necessarily (but preferably) a track bound vehicle. A vehicle other than a track bound vehicle is a bus, for example. An application area of the invention is the transfer of energy to vehicles for public transport. However, it is also possible to transfer energy to private automobiles using the system of the present invention. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

In order to reduce or avoid electromagnetic fields where no vehicle is driving at a time, segments of the conductor arrangement may be operated where required only. For example, the lengths of the segments along the path of travel are shorter than the length of a vehicle in the travel direction and the segments may be operated only if a vehicle is already occupying the respective region of the path of travel along which the segment extends. In particular, occupied by a rail vehicle means that the vehicle is driving on the rails along which the segment extends. For continuous energy transfer while the vehicle is driving, it is proposed that the segment is switched on (i.e. the assigned controller starts the production of the alternating current through the segment) before a receiving device of a vehicle for receiving the transferred energy enters the region of the path of travel along which the segment extends. However, this means that two or more than two consecutive segments may be operated at the same time. Otherwise, the energy transfer to the vehicle may be interrupted and transients of the voltage induced in the vehicle's receiver may be generated.

WO 2010/031593 A1 describes a system and a method for transferring electric energy to a vehicle, wherein the system comprises the features mentioned above. However, the segments are electrically connected in series to each other and there is one inverter at each interface between two consecutive segments. It is disclosed that switches of the inverters are controlled to produce the alternating current. Each switch may be controlled by a drive unit which controls the timing of individual processes of switching on and switching off the switch. The drive units may be controlled by a controller of the inverter which coordinates the timing of all drive units. The synchronization of different inverters may be performed by a single higher-level control device by transferring synchronization signals to each controller of the inverters to be synchronized. A synchronization link may be provided, which may be a digital data bus. The link extends along the path of travel of the vehicle and comprises connections to each controller in order to transfer synchronization signals. In addition, there is also a connection from each controller to the synchronization link. The reverse connections are used to transfer signals from the controllers to the synchronization link and thereby to other controllers which are connected to the synchronization link. One of the controllers being a master controller at a time outputs synchronization signals via the reverse connection and via the synchronization link to the other controllers for synchronizing the operation of all controllers which are operated at a time. If the inverter which is controlled by the master controller ceases operation another controller takes over the task of being the master controller. The new master controller outputs synchronization signals via its reverse connection and via the synchronization link to the other controllers.

According to WO 2010/031593 A1, synchronization is performed either at a phase shift or with no phase shift. This means that at opposite ends of one segment or of consecutive segments inverters are either operated with phase shift or no phase shift and, correspondingly, an alternating current flows through the phase lines of the segment or consecutive segments, if there is a phase shift, or no current flows through the phase lines, if there is no phase shift. As a result, the synchronization disclosed in WO 2010/031593 A1 is performed for the sole purpose to either generate an alternating current or not to generate an alternating current in a segment or in consecutive segments.

It is a disadvantage of this conductor arrangement having consecutive segments which are connected in series to each other that there is still an electric voltage between the alternating current phase lines of the segments and a reference potential if the alternating current carried by the phase lines of the segments is zero. Consequently, it is more difficult to meet requirements concerning electromagnetic compatibility (EMC). Furthermore, the phase shift between inverters at opposite ends of a segment or of consecutive segments may not be exactly zero. As a result, electric currents may flow through the phase lines of the segment(s) unintentionally.

SUMMARY OF THE INVENTION

It is an object of the present invention to provide a system for inductively transferring electric energy to a vehicle which reduces electric and/or electromagnetic field emissions. It is a further object to provide a corresponding method of manufacturing the system and a corresponding method of operating the system.

It is a basic idea of the present invention to provide or use a conductor arrangement comprising a plurality of consecutive segments which are electrically connected in parallel to each other. During operation of a segment, the alternating current lines of the respective segment carry an alternating current in order to produce the alternating electromagnetic field for inductive energy transfer.

A corresponding system comprises an electric conductor arrangement for producing an alternating electromagnetic field and for thereby transferring electromagnetic energy to the vehicle. The conductor arrangement comprises a plurality of consecutive segments, wherein the segments extend in the direction of travel of the vehicle, which is defined by the track or path of travel. Each segment is combined with an assigned controller (e.g. the control device of an inverter, which inverts a direct current in a current supply into an alternating current through the segment, or of an AC/AC converter which, in particular, converts an alternating current in an alternating current supply to an alternating current in the respective segment having a different frequency) adapted to control the operation of the segment independently of the other segments. The controllers of at least two consecutive segments, which follow each other in the direction of travel of the vehicle, or follow each other opposite to the direction of travel, are connected to each other and/or to a central controlling device so that the at least two consecutive segments can operated at the same time. Each segment comprises at least three alternating current lines for carrying phases of a multi-phase alternating current in order to produce the alternating electromagnetic field. Each line carries a different phase during operation. The alternating current lines of each segment comprise a plurality of sections which extend transversely to the direction of travel of the vehicle. The transversely extending sections of the at least three alternating-current lines of each segment form, if viewed in the direction of travel, a repeating sequence of phases of the alternating current, while the segment is operated under control of the assigned controller, wherein each complete repetition of the sequence of phases comprises one transversely extending section of each phase and the order of the phases is the same in each complete repetition. For example in the case of a three-phase alternating current having phases U, V, W, the order of the sequence of the transversely extending sections may be U-V-W-U-V-W (and so on) and one complete repetition of the sequence of phases is U-V-W.

It is an advantage of parallel segments that the voltage between the different alternating current lines of the segment can be zero while the segment is not operated, e.g. by switching off the alternating current lines and thereby setting the electric potentials of the alternating current lines to zero.

The inventors have observed that the way of operating two or more consecutive segments at the same time also influences the electromagnetic field. In particular, discontinuities of the electromagnetic field at the interface of two consecutive segments produce undesired frequency signals in the field itself and in the receiver system of the vehicle which receives the electromagnetic field. The effect is similar to the effect of a step-like change of an electric current.

In particular, the interface of two consecutive segments is not constituted by an electric line or electric lines, but is an area (which may be called transition zone) where the consecutive segments pass over to each other. As will be described later, it is preferred that there is a transition zone in the direction of travel, wherein transversely extending sections of alternating current lines of both consecutive segments are located within the transition zone.

Therefore, it is proposed to operate the two consecutive segments or more than two consecutive segments, which are operated at the same time, so that the transversely extending sections of the at least three alternating current lines of the consecutive segments from a repeating sequence of phases of the alternating current. This repeating sequence of phases is the same within the extension of the individual segments and in the transition zone of two consecutive segments. For example, in the case of a three-phase alternating current having phases U, V, W, the order of the sequence of the transversely extending sections may be U-V-W-U-V-W . . . (as mentioned above). In case of a four-phase alternating current having phases U, V, W, X, the order would be U-V-W-X-U-V-W-X . . . . Therefore, this order also applies to the transition zones of consecutive segments which are operated at the same time. Consequently, "repeating sequence" in this description means that the order of the phases repeats in the same manner. One complete repetition of the sequence of phases is constituted by one occurrence of each phase of the alternating current.

As mentioned, the repeating sequence of phases is formed by the transversely extending sections of the at least three alternating current lines of the consecutive segments. Consequently, a transversely extending section for carrying a first phase (e.g. phase U) is followed by a transversely extending section for carrying a second phase (e.g. phase V), the second transversely extending section is followed by a transversely extending section for carrying a third phase (e.g. phase W), in case of more than three phases this transversely extending section is followed by a transversely extending section for carrying a fourth phase (e.g. phase X) and so on until a transversely extending section for carrying the last, remaining phase of the multi-phase alternating current. In the above example of three phases U, V, W, the last phase is W. In the above example of four phases U, V, W, X, the last phase is X. The transversely extending section for carrying the last phase is followed by a second transversely extending section for carrying the first phase (e.g. phase U), followed by a second transversely extending section for carrying the second phase (e.g. phase V), and so on. In the case of three phases of the alternating current, every third transversely extending section carries the same phase during operation and this also applies to the transition zones of consecutive segments.

In particular, the following is proposed: A system for transferring electric energy to a vehicle, in particular to a track bound vehicle such as a light rail vehicle or to a road automobile, wherein the system comprises an electric conductor arrangement for producing an alternating electromagnetic field and for thereby transferring the energy to the vehicle, the conductor arrangement comprises a plurality of consecutive segments, wherein the segments extend in the direction of travel of the vehicle, which is defined by the track or path of travel, each segment is combined with an assigned controller adapted to control the operation of the segment independently of the other segments, the controllers of at least two consecutive segments, which follow each other in the direction of travel of the vehicle, or which follow each other opposite to the direction of travel, are connected to each other and/or to a central controlling device so that the at least two consecutive segments can operated at the same time, each segment comprises at least three alternating current lines for carrying phases of a multi-phase alternating current in order to produce the alternating electromagnetic field, the consecutive segments are electrically connected in parallel to each other to a current supply, the alternating current lines of each segment comprise a plurality of sections which extend transversely to the direction of travel of the vehicle, the transversely extending sections of the at least three alternating-current lines of each segment form, if viewed in the direction of travel, a repeating sequence of phases of the alternating current, while the segment is operated under control of the assigned controller, wherein each complete repetition of the sequence of phases comprises one transversely extending section of each phase and the order of the phases is the same in each complete repetition, the controllers of the at least two consecutive segments and/or the central controlling device are/is adapted to operate the at least two consecutive segments, so that the repeating sequence of phases continues from one segment to the consecutive segment, wherein the order of the phases is the same in the at least two consecutive segments and in each transition zone of two of the at least two consecutive segments.

In addition a method of operating a system is proposed for transferring electric energy to a vehicle, in particular to a track bound vehicle such as a light rail vehicle or to a road automobile, wherein an electric conductor arrangement is operated for producing an alternating electromagnetic field and for thereby transferring the energy to the vehicle, a plurality of consecutive segments of the conductor arrangement is operated, wherein the segments extend in the direction of travel of the vehicle, which is defined by the track or path of travel, for each segment, an assigned controller is operated to control the operation of the segment independently of the other segments, the controllers of at least two consecutive segments, which follow each other in the direction of travel of the vehicle, or which follow each other opposite to the direction of travel, are operated in connection with each other and/or with a central controlling device so that the at least two consecutive segments are operated at the same time, in each segment, at least three alternating current lines carry phases of a multi-phase alternating current in order to produce the alternating electromagnetic field, the consecutive segments are electrically connected in parallel to each other to a current supply, the alternating current lines of each segment comprise a plurality of sections which extend transversely to the direction of travel of the vehicle, the transversely extending sections of the at least three alternating-current lines of each segment form, if viewed in the direction of travel, a repeating sequence of phases of the alternating current, while the segment is operated under control of the assigned controller, wherein each complete repetition of the sequence of phases comprises one transversely extending section of each phase and the order of the phases is the same in each complete repetition, the controllers of the at least two consecutive segments and/or the central controlling device operate(s) the at least two consecutive segments, so that the repeating sequence of phases continues from one segment to the consecutive segment, wherein the order of the phases is the same in the at least two consecutive segments and in each transition zone of two of the at least two consecutive segments.

Embodiments of the operating method follow from the description of the system and the appended claims.

Furthermore, a method of manufacturing a system is proposed, for transferring electric energy to a vehicle, in particular to a track bound vehicle such as a light rail vehicle or to a road automobile, wherein an electric conductor arrangement is provided for producing an alternating electromagnetic field and for thereby transferring the energy to the vehicle, the conductor arrangement comprises a plurality of consecutive segments, wherein the segments extend in the direction of travel of the vehicle, which is defined by the track or path of travel, each segment is combined with an assigned controller adapted to control the operation of the segment independently of the other segments, the controllers of at least two consecutive segments, which follow each other in the direction of travel of the vehicle, or which follow each other opposite to the direction of travel, are connected to each other and/or to a central controlling device so that the at least two consecutive segments can operated at the same time, each segment comprises at least three alternating current lines for carrying phases of a multi-phase alternating current in order to produce the alternating electromagnetic field, the consecutive segments are electrically connected in parallel to each other to a current supply, the alternating current lines of each segment comprise a plurality of sections which extend transversely to the direction of travel of the vehicle, the transversely extending sections of the at least three alternating-current lines of each segment form, if viewed in the direction of travel, a repeating sequence of phases of the alternating current, while the segment is operated under control of the assigned controller, wherein each complete repetition of the sequence of phases comprises one transversely extending section of each phase and the order of the phases is the same in each complete repetition, the controllers of the at least two consecutive segments and/or the central controlling device are/is adapted to operate the at least two consecutive segments, so that the repeating sequence of phases continues from one segment to the consecutive segment, wherein the order of the phases is the same in the at least two consecutive segments and in each transition zone of two of the at least two consecutive segments.

Embodiments of the manufacturing method follow from the description of the system and the appended claims.

The repeating sequence of phases of the alternating current allow for production of a continuous electromagnetic field in the transition zones of consecutive segments if the segments are operated at the same time. Preferably, the distance between any two transversely extending sections, which follow each other in the direction of travel, is constant. Therefore, the electromagnetic field produced is particularly homogeneous with respect to the direction of travel.

The transversely extending sections produce the relevant parts of the electromagnetic field for energy transfer to the vehicle. In particular, as described in WO 2010/031593 A1, they produce a row of successive magnetic poles of an electromagnetic field, wherein the successive magnetic poles have alternating magnetic polarities. The row of successive magnetic poles extends in the travel direction of the vehicle. In this case, the alternating current flows through successive sections of the same phase alternating in opposite directions. In practice, this can be realised by alternating current lines which extend along a meandering path in the direction of travel. In particular, the alternating current lines may be located alternating on opposite sides of the conductor arrangement. Due to this serpentine-like configuration of the alternating current lines, the transversely extending sections are connected to each other by other sections which at least partly extend in the direction of travel.

In particular, the assigned controller may control a converter which is connected to a direct current supply line on a direct current side (i.e. the supply side) of the converter and which is connected to the alternating current lines of the segment on an alternating current side (i.e. the segment side) of the converter. Therefore, the converters are inverters. These inverters and the current supply may be adapted in the way described in WO 2010/031593 A1. Alternatively, the current supply line may be an alternating current supply line. In this case, the converters are AC/AC converters which, in particular, convert the alternating current in the alternating current supply to an alternating current in the segments having a different frequency. It is also possible to combine two or more current supplies, namely at least one alternating current supply with at least one direct current supply, wherein each supply is connected to the respective segment via either an inverter or an AC/AC converter.

In contrast to the arrangement of WO 2010/031593 A1, due to the parallel arrangement of the segments, each segment is only indirectly connected to the other segments via the assigned converter (either an inverter or an AC/AC-converter), the supply line and the respective assigned converter of the other segment. However, according to a specific embodiment, the same converter may be assigned to a plurality of segments. In this case, the individual segments which are connected to the common assigned converter are not consecutive segments and, preferably, are not operated at the same time. For example, a corresponding switch or set of switches is provided in an alternating current connection between the segment side of the converter and at least one of the segments. By controlling the switch or switches, the segment or segments is/are selected which can be operated by the converter (by feeding an alternating current to the segment) at a time.

Furthermore, it is preferred that there is a synchronization link which is connected to the converters for synchronizing operation of the converters. The system is adapted to synchronize the assigned converters of consecutive segments, which are operated at the same time, in a manner so that the electromagnetic field produced by the consecutive segments is continuous at the interface or interfaces between the consecutive segments.

With respect to the system, the following is preferred:
for a sequence of consecutive segments, an converter is assigned and connected to each segment, wherein the assigned converter is connected to a current supply and is adapted to convert a current carried by the current supply to an alternating current carried by the at least one alternating current line of the segment, so that there is a sequence of assigned converters for the corresponding sequence of consecutive segments,
each of the converters of the sequence of assigned converters is connected to a synchronization link for synchronizing operation of the sequence of assigned converters,
the system is adapted to synchronize the sequence of assigned converters in a manner so that the electromagnetic field produced by the sequence of consecutive segments is continuous at the interface or interfaces between the consecutive segments.

With respect to the operating method, the following is preferred:
for a sequence of consecutive segments, a converter is assigned and connected to each segment, wherein the assigned converter is connected to a current supply and converts—during operation of the segment—a current carried by the current supply to an alternating current carried by the at least one alternating current line of the segment, so that there is a sequence of assigned converters for the corresponding sequence of consecutive segments,
each of the converters of the sequence of assigned converters is connected to a synchronization link for synchronizing operation of the sequence of assigned converters and receives and/or outputs—during operation of the segment and if another converter of the sequence of assigned converters is also operated—a synchronization signal via the synchronization link,
the sequence of assigned converters is synchronized in a manner so that the electromagnetic field produced by the sequence of consecutive segments is continuous at the interface or interfaces between the consecutive segments.

With respect to the manufacturing method, the following is preferred:
for a sequence of consecutive segments, assigning and connecting an converter to each segment, wherein the assigned converter is connected to the current supply and is adapted to convert a current carried by the current supply to an alternating current carried by the at least one alternating current line of the segment, so that there is a sequence of assigned converters for the corresponding sequence of consecutive segments,
connecting each of the converters of the sequence of assigned converters to a synchronization link for synchronizing operation of the sequence of assigned converters,
enabling the system to synchronize the sequence of assigned converters in a manner so that the electromagnetic field produced by the sequence of consecutive segments is continuous at the interface or interfaces between the consecutive segments.

Due to the conductor arrangement as described above and below and due to the synchronization of the assigned converters of consecutive segments, the electromagnetic field does not comprise step-like changes of the field intensity at the interface, at each point in time while the consecutive segments are operated together. In particular, the course of the electromagnetic field in the direction of travel does not change at the interface between the consecutive segments, due to the synchronization. The electromagnetic field, which is produced by the at least three alternating current lines per segment may be produced as a moving magnetic wave, i.e. the magnetic flux fluctuates in the manner of a wave (an example will be given below), which moves in or opposite to the direction of travel of the vehicle, the wave being continuous in the transition zone(s) of the consecutive segments. In particular, the assigned controllers of the at least two consecutive segments are synchronized so that the electromagnetic field produced by the at least two consecutive segments forms the magnetic wave. Such a moving wave has the advantage that the vehicle may stop at any location and the inductive energy transfer may continue independently of the location.

As mentioned above, the alternating current lines may follow a meandering path in the direction of travel. Consequently, the transversely extending sections of the alternating current lines are connected to each other by connecting sections which at least partly extend in the direction of travel. For example, these connecting sections may comprise curved line sections.

In order to produce a homogenous electromagnetic field having constant width in the direction of the extension of the transversely extending sections, these transversely extending sections should have the same lengths. As a result, the connecting sections of the different transversely extending sections are located in the same two side margins at the opposite (lateral) sides of the conductor arrangement. Depending on the way of arranging the connecting sections, the space which is required for laying the connecting sections in the side margins differs.

It is an object of the preferred embodiment, which will be described in the following, to reduce the space in the side margins which is required for the connecting sections. In particular, the depth of the side margins (in the vertical direction) should be as small as possible, since the alternating current lines may weaken the construction of the track.

In order to solve this object, it is proposed to arrange the alternating current lines in a manner so that, in the course of the meandering path of the respective alternating current line:
- the transversely extending section of a first phase of the alternating current extends from a first side of the conductor arrangement towards a second side of the conductor arrangement, which is the side opposite to the first side of the conductor arrangement,
- the transversely extending section of a second phase of the alternating current, which follows the first phase in the order of phases, extends from the second side of the conductor arrangement towards the first side of the conductor arrangement,
- the transversely extending section of a third phase of the alternating current, which follows the second phase in the order of phases, extends from the first side of the conductor arrangement towards the second side of the conductor arrangement,
- if there are more than three phases, the transversely extending section(s) of the next phase or next phases in the order of phases extend(s) in the opposite direction between the first and second side of the conductor arrangement compared to the transversely extending section of the preceding phase in the order of phases, until the last phase is reached.

In addition or alternatively, this object is solved by a conductor arrangement, wherein, if viewed in the direction of travel from a first of the two consecutive segments to a second of the two consecutive segments, a transversely extending section of the first consecutive segment follows a transversely extending section of the second consecutive segment in the repeating sequence of phases of the alternating current. For example, in the case of a three-phase alternating current having phases U, V, W, and if the order of the sequence of the transversely extending sections is U-V-W-U-V-W-U-V-W . . . (as mentioned above), the first six transversely extending sections may be part of the second segment, the third transversely extending section carrying phase U may be part of the second segment, the third transversely extending section carrying phase V may be part of the first segment and all further transversely extending sections in the sequence may be part of the second segment or of further segments. To illustrate this, a number can be added to the letter of the phase, wherein the number designates the segment which comprises the transversely extending section. E.g., U1 denotes a transversely extending section carrying phase U belonging to segment 1. According to the above example, the sequence of phases can therefore be denoted by: U1-V1-W1-U1-V1-W1-U2-V1-W2 . . . . In case of a four-phase alternating current having phases U, V, W, X, an example of a sequence would be: U1-V1-W1-X1-U1-V2-W1-X2 . . . .

The transversely extending sections, which follow each other in the order of the phases and which belong to different segments, are located in the transition zone of the two consecutive segments. They are the first or last transversely extending sections of the respective segment which carry a particular phase. These first or last transversely extending sections can be used in particular for connecting the alternating current lines to a converter (see above) or to another device which feeds the alternating current lines with the alternating current during operation. Alternatively, these last or first transversely extending sections can be connected to the other alternating current lines of the same segment to form an electric star point connection. Since the first and last transversely extending sections alternating belong to different segments it is possible to form the repeating sequence of phases at regular distances between the transversely extending sections, wherein the first solution of the object described above (saving space in the side margins) is realized, namely the next transversely extending section in the order of phases extends in the opposite direction between the first and second side of the conductor arrangement compared to the transversely extending section of the preceding phase in the order of the phases, if the course of the meandering alternating current lines is followed. In other words, the two solutions of the object are equivalent, if regular, constant distances between the transversely extending sections are realized not only within the segments, but also in the transition zone of the two consecutive segments.

According to a preferred embodiment, each of the converters (e.g. inverters and/or AC/AC-converters) comprises a control device (in particular the assigned controller mentioned above) which is connected to the synchronization link for receiving a synchronization signal transferred by the synchronization link, wherein the control devices of the sequence of assigned converters are adapted to output a synchronization signal via the synchronization link to the consecutive converter of the sequence of assigned converters. Output and receipt of a synchronization signal may depend on the question whether the converter, the preceding converter and/or the successive converter is operated. For example, the output of a synchronization signal to the consecutive converter (i.e. the successive converter) may stop if the operation of the converter is ceased. Consequently, the successive converter may not receive a synchronization signal anymore, but may output a synchronization signal to its consecutive converter, so that synchronized operation of the consecutive converters is guaranteed. In addition or alternatively, starting operation of a converter may cause starting the output of a synchronization signal to the consecutive converter.

In particular, the control devices of the sequence of assigned converters are adapted or operated to output the synchronization signal only if the converter, which comprises the control device, is operating, i.e. is producing the alternating current carried by the corresponding segment of the sequence of consecutive segments.

Transferring synchronization signals from any converter to the respective consecutive converter only has the advantage that no central synchronization control is required. On the other hand, delays of the delivery of synchronization signals are minimized and are the same for each pair of consecutive converters, provided that the ways of transferring the synchronization signal and the sectional lengths of the synchronization link between the consecutive converters are the same for all pairs of consecutive converters. In particular, delay can be anticipated and, thereby, its effect can be eliminated.

Preferably, the synchronization signal is a continuous signal which is transferred at least during operation of the converter or converters. For example, the synchronization signal can be a signal which is also used internally by the converter to control the switching processes of switches which generate the alternating current on the segment side of the converter. Typical signals for this internal control are pulse width modulation control signals which are transferred from a central controller of the converter to different drive units which actually drive the electric currents that cause the switching of the switches. In this context, the term pulse width modulation control signal is understood to be the control signal which is used to produce the result of a pulse width modulation process. Alternatively, instead of pulse width modulation control signals, clock signals of the central controller of the converter may be output as synchronization signal. According to a specific embodiment, the synchronization signal may be a binary signal having two different signal levels corresponding to "0" and "1", wherein the level change from "0" to "1" or vice versa is used to synchronize the phase of the alternating current produced by the converter and wherein the length of time between a change from "0" to "1" or vice versa to the next change from "0" to "1" or from "1" to "0" is used to synchronize the time period of periodic processes during the operation of the converters, such as the time period of the alternating current which is produced by the converter. Variants are possible, such as using the time period of the synchronization signal for defining a pre-defined fraction of the time period of the alternating current produced by the converter.

In some cases, vehicles may travel always in the same direction along the consecutive segments of the conductor arrangement. However, in other cases, the direction of travel may change from time to time to the opposite direction. In the latter case, it is preferred that the system comprises a control unit which is connected to the synchronization link and which is adapted to output a direction selection signal via the synchronization link to at least one of the control devices of the converters and wherein the system is adapted in such a manner that the control device(s) receiving the direction selection signal outputs the synchronization signal via the synchronization link to the converter which is the consecutive converter in the direction of the sequence of assigned converters which corresponds to the direction selection signal, i.e. the synchronization signal is output either to the consecutive converter in a first direction or to the consecutive converter in the opposite direction depending on the direction selection signal. In other words, the order of the sequence of assigned converters can be reversed, if necessary. In particular, the synchronization link may comprise an additional line for transferring the direction selection signal to the converters.

The following aspect of the invention can be realized in connection with the basic idea of the present invention, as mentioned above, but can also be realized if the operation of the at least two consecutive segments is performed in a different manner and/or if the segments are not parallel to each other. This aspect of the invention refers to the following: A system for transferring electric energy to a vehicle, in particular to a track bound vehicle such as a light rail vehicle or to a road automobile, wherein the system comprises an electric conductor arrangement for producing an alternating electromagnetic field and for thereby transferring the energy to the vehicle, the conductor arrangement comprises a plurality of consecutive segments, wherein the segments extend along the path of travel of the vehicle, each segment comprising at least one alternating current line for carrying an alternating current in order to produce the alternating electromagnetic field, the system comprises a current supply (e.g. a direct current supply or an alternating current supply) for supplying electric energy to the segments, the segments are electrically connected in parallel to each other to the current supply, an converter is assigned and connected to each segment, wherein the assigned converter is connected to the current supply and is adapted to convert a current carried by the current supply to an alternating current carried by the at least one alternating current line of the segment.

Optionally, a sequence of the assigned converters may be defined which corresponds to a corresponding sequence of consecutive segments.

The underlying problem of the aspect is that at least some of the converters are not operated continuously, since the corresponding segment should not produce an electromagnetic field all the time. Corresponding reasons have been explained above. For example, if the presence of a vehicle above the respective segment is detected or if it is detected that a vehicle will occupy the space next to the segment (in particular above the segment) according to a pre-defined criterion, the converter which is assigned to the segment should start operation. It is an object of this aspect of the invention that the operation should be started effectively and reliably. In particular, fluctuations of the alternating electric current, which is produced by the converter immediately after starting the operation, should be reduced or avoided. Fluctuation of the alternating current would cause fluctuations of the frequency and/or of the field intensity which is produced by the segment which, in turn, would cause transients of the voltage which is induced in the receiver of the vehicle.

It is proposed that at least one of the converters and preferably all converters comprise(s) a starting device for starting operation of the converter.

The starting device is adapted to start the operation of the converter in two steps. In the first step a power supply of the converter is switched on. In the second step, with a predefined delay after the first step or when it has been detected that the power supply has become stable, production of the alternating current carried by the corresponding segment is enabled. Regarding the method of operating the system operation of the converter is started in two steps, first switching on power supply and second, with a predefined delay or when it has been detected that the power supply has become stable, enabling production of the alternating current carried by the corresponding segment. Enabling production of the alternating current means that the production of the alternating current is started. In other words, the production of the alternating current is not started when the power supply of the converter is switched on, but is started later in the second step. Consequently, since there is time for the power supply to become stable, the alternating current can be produced in a stable manner from start onwards.

Preferably, synchronization is also realized in connection with this aspect of the invention. In this case, the converter receives a synchronization signal preferably when the first step of the start operation is performed and, therefore, the synchronization signal can be used by the converter when the power supply has been switched on to prepare synchronized operation, before the production of the alternating current is started. For example, a central controller of the converter, which is adapted to control the operation of switch drive units (for driving switches of the converter) may be started in the first step or in between the first step and the second step of the starting operation. The synchronization signal may be used to synchronize the operation of the central controller before the operation of the switches of the converter is started which causes the production of the alternating current. In particular, the power supply of the switch drive units may be switched on later than the power supply of the converter, namely in the second step and, thereby, the production of the alternating current is started.

BRIEF DESCRIPTION OF THE DRAWINGS

Examples of the present invention and further embodiments will be described with reference to the attached drawing. The figures of the drawing show.

DESCRIPTION OF THE INVENTION

In the examples which are described with reference to the figures the converters are inverters, but corresponding examples may comprise AC/AC-converters and the direct current supply may be an alternating current supply instead.

Figure 1:
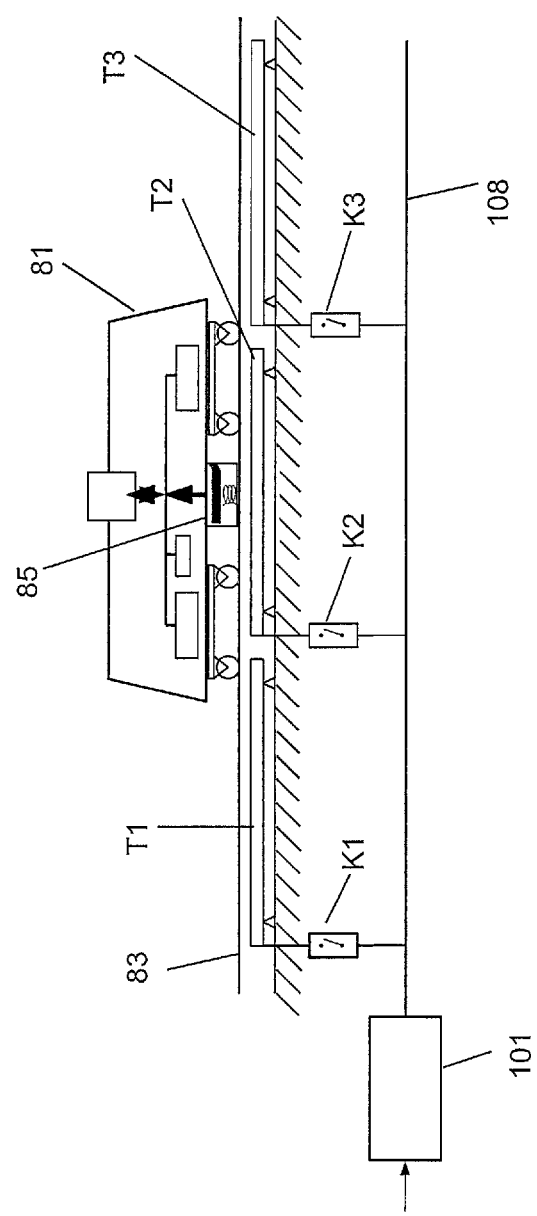
FIG. 1 schematically a rail vehicle which is travelling on a track that is equipped with an electric conductor arrangement comprising a plurality of consecutive segments which are connected in parallel to each other to a direct current supply, FIG. 2 an example of a three-phase conductor arrangement of a single segment, FIG. 3 a diagram showing alternating currents through the three phases of the arrangement according to FIG. 2, FIG. 4 a diagram showing schematically the movement of a magnetic wave produced by the conductor arrangement along the track and showing the movement of the receiving device due to the movement of the vehicle on the track, FIG. 5 for three different points in time, a situation in which a rail vehicle travels on a track, wherein the track is provided with a plurality of consecutive segments of a conductor arrangement, wherein the segments can be switched on and off for providing the vehicle with energy, FIG. 6 a preferred embodiment of a three-phase conductor arrangement at the transition zone of two consecutive segments of the conductor arrangement, wherein electric lines of the two consecutive segments are arranged to extend from the transition zone to a location sideways of the track, FIG. 7 an arrangement similar to the arrangement shown in FIG. 6, wherein two star-point connections of the three phases of the consecutive segments are located in the transition zone, FIG. 8 an arrangement similar to the arrangement shown in FIG. 1, wherein the alternating current lines of in each case two consecutive segments extend from a common transition zone to respective inverters in the manner shown in FIG. 6, FIG. 9 an arrangement similar to the arrangement shown in FIG. 8, wherein inverters are assigned to two segments of the conductor arrangement, wherein the segments which are connected to the same inverter are not consecutive segments, i.e. are not neighbouring segments in the sequence of consecutive segments, FIG. 10 a module which is connected to the direct current supply line shown in FIG. 9 and is also connected to the three alternating current lines of two segments, wherein the module comprises an inverter, a constant current source and arrangement of switches for switching on and off the three alternating current lines of the segments so that only one of the segments is provided with electric energy from inverter at a time, FIG. 11 an arrangement similar to the arrangement shown in FIG. 8, wherein the consecutive segments do not have the same lengths in the direction of travel and wherein the track is adapted to provide energy to a bus instead of a tram, wherein an enlarged view of one of the inverters is shown in the lower left of the figure, FIG. 12 a circuit diagram showing schematically three consecutive segments of a conductor arrangement, for example the conductor arrangement shown in FIG. 1, FIG. 5, FIG. 8, FIG. 10 or FIG. 11, wherein an inverter is assigned to each segment for producing an alternating current and wherein each inverter is connected to a synchronization link and to a direct current supply, FIG. 13 a block diagram schematically illustrating an embodiment of the arrangement for starting the operation of a inverter, FIG. 14 a circuit diagram of a specific embodiment of an inverter comprising a starting device for starting the operation of the inverter, FIG. 15 an embodiment of an interface between an inverter and a synchronization link, wherein an additional direction selection signal line is provided, FIG. 16 a top view of a shaped block, which may be used to support the lines of a segment, and FIG. 17 a vertical cross-section through half of the block of FIG. 16.

FIG. 1 shows a rail vehicle 81 travelling on a track 83 which is provided with a conductor arrangement for producing an electromagnetic field which induces an electric voltage in a receiver 85 of the vehicle 81.

The conductor arrangement is constituted by a plurality of consecutive segments T1, T2, T3. Further segments may be provided, but are not shown in FIG. 1. Each segment T1, T2, T3 is connected to a direct current supply 108 via in each case one assigned inverter K1, K2, K3. The direct current in the supply 108 is provided by a power source 101.

Figure 2:
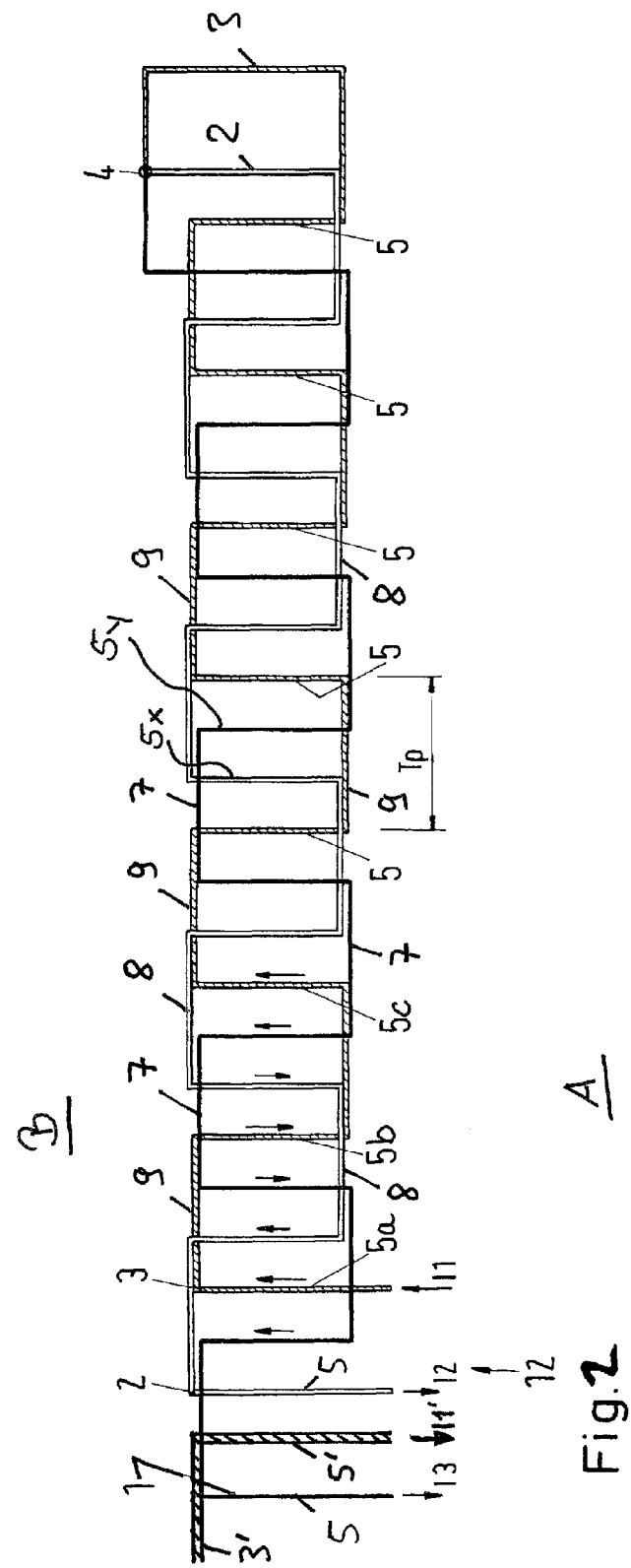

FIG. 2 shows the part of a conductor arrangement which may constitute one segment. The figure is understood to show a schematic view, but the distances between the transversely extending sections of the conduct arrangement may be to scale. The three lines 1, 2, 3 of the conductor arrangement comprise these sections which extend transversely to the direction of travel (from left to right or right to left). Only some of the transversely extending sections of lines 1, 2, 3 are denoted by a reference numerals, namely three sections 5a, 5b and 5c of line 3, some further sections of the line 3 by "5", one section 5x of line 2 and one section 5y of line 1. In the most preferred case, the arrangement 12 shown in FIG. 2 is located underground of the track so that FIG. 2 shows a top view onto the arrangement 12. The track may extend from left to right, at the top and the bottom in FIG. 2, i.e. the transversely extending line sections may be completely within the boundaries defined by the limits of the track.

Figure 8:
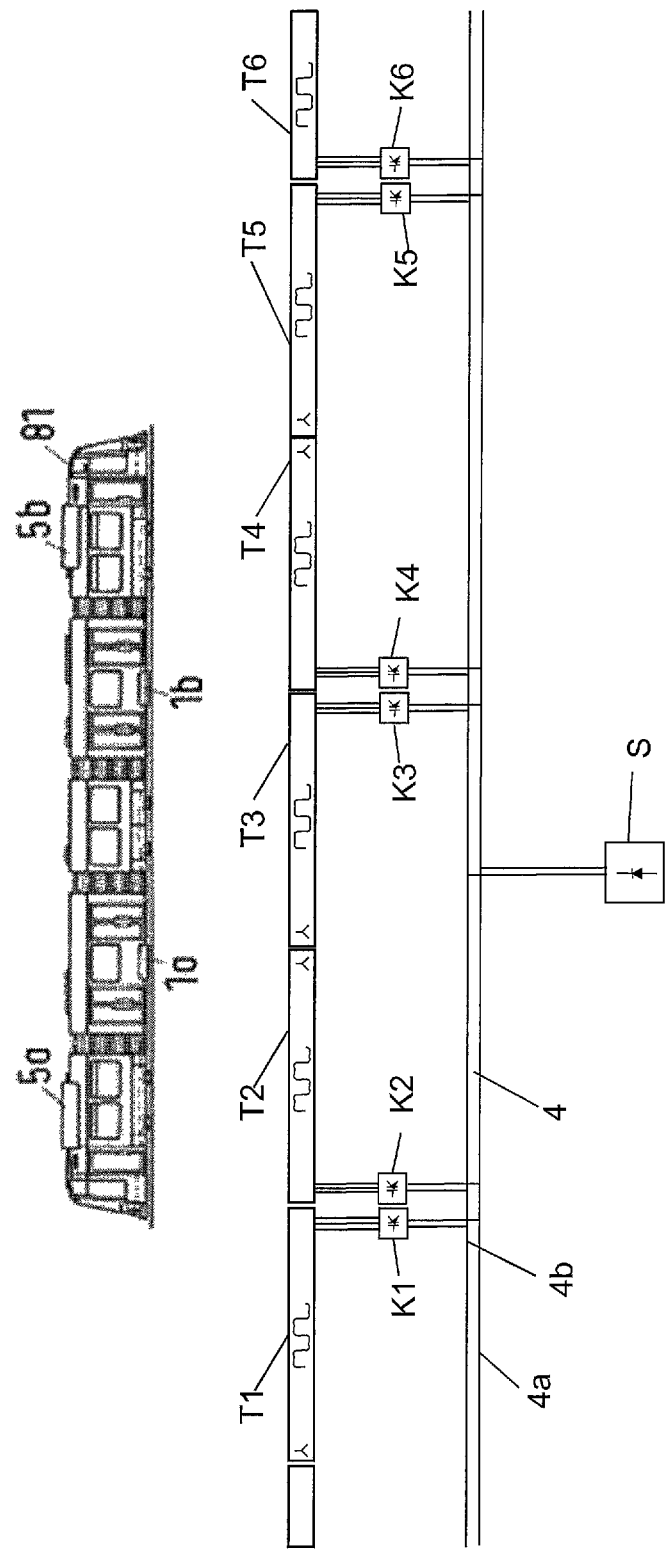

For example in the manner as shown in FIG. 8, the three lines 1, 2, 3 may be connected to an inverter K. At the time which is depicted in FIG. 2, a positive current I1 is flowing through line 3. "Positive" means, that the current flows from the inverter into the line. The three lines 1, 2, 3 are connected to each other at the other end of the arrangement at a common star point 4. Consequently, at least one of the other currents, here the current I2 through the line 2 and the current I3 through the line 1, are negative. Generally speaking, the star point rule applies which means that the sum of all currents flowing to and from the star point is zero at each point in time. The directions of the currents through lines 1, 2, 3 are indicated by arrows.

The sections of line 3 and the corresponding sections of lines 1, 2 which extend transversely to the direction of travel preferably have the same width and are parallel to each other. In practice, it is preferred that there is no shift in width direction between the transversely extending sections of the three lines. Such a shift is shown in FIG. 2 for the reason that each section or each line can be identified.

Preferably, each line follows a serpentine-like path (also called: meandering path) along the track in the same manner, wherein the lines are shifted in the direction of travel by one third of the distance between consecutive sections of the same line extending transversely to the direction of travel. For example, as shown in the middle of FIG. 2, the distance between consecutive sections 5 of line 3 is denoted by $T_P$. Within the region between these consecutive sections 5, there are two other sections which extend transversely to the direction of travel namely, section 5x of line 2 and section 5y of line 1. This pattern of consecutive sections 5, 5x, 5y repeats at regular distances between these sections in the direction of travel.

The corresponding direction of the current which flows through the sections is shown in the left region of FIG. 2. For example, section 5a carries a current from a first side A of the arrangement 12 to the opposite side B of the arrangement. Side A is one side of the conductor arrangement or track (such as the right hand side in the direction of travel, when viewed from a travelling vehicle) and side B is the opposite side (e.g. the left side of the track), if the arrangement 12 is buried in the ground under the track, or more generally speaking, extends in a horizontal plane.

The consecutive section 5b consequently carries an electric current at the same time which is flowing from side B to side A. The next consecutive section 5c of line 3 is consequently carrying a current from side A to side B. All these currents have the same size, since they are carried by the same line at the same time. In other words: the sections which extend transversely are connected to each other by connecting sections which extend in the direction of travel.

As a result of this serpentine like line arrangement, the magnetic fields which are produced by sections 5a, 5b, 5c, . . . of the line 3 produce a row of successive magnetic poles of an electromagnetic field, wherein the successive magnetic poles (the poles produced by section 5a, 5b, 5c, . . . ) have alternating magnetic polarities. For example, the polarity of the magnetic pole which is produced by section 5a may correspond at a specific point in time a magnetic dipole, for which the magnetic north pole is facing upwardly and the magnetic south pole is facing downwardly. At the same time, the magnetic polarity of the magnetic field which is produced by section 5b is oriented at the same time in such a manner that the corresponding magnetic dipole is facing with its south pole upwardly and with its north pole downwardly. The corresponding magnetic dipole of section 5c is oriented in the same manner as for section 5a and so on. The same applies to lines 1 and 2.

However, the present invention is focussed on the case that there are at least three phases and, correspondingly, three alternating current lines. Therefore, the above description of line 3 also applies to lines 1 and 2. In contrast, a conductor arrangement having only one phase may be arranged as line 3 in FIG. 2, but instead of the star point 4, the end of the line 3 (which is located at the right hand side of FIG. 2) may also be connected to the inverter (not shown in FIG. 2) by a connector line (not shown in FIG. 2) which extends along the track. A two-phase arrangement may consist of lines 3 and 2, for example, but the distance between the transversely extending sections of the two lines (or more generally speaking: of all lines) is preferably constant (i.e. the distances between a transversely extending section of line 3 to the two nearest transversely extending section of line 2—in the direction of travel and in the opposite direction—are equal).

In the case of the example shown in FIG. 2, but also in other cases, it is an object to avoid transients of the electromagnetic field which is produced at the interface of consecutive segments. Such transients may occur for different reasons. One possible reason is the arrangement of the alternating current lines at the opposite ends of the segment. The distance $T_P$ between consecutive transversely extending sections 5 of the same line was mentioned above. Since there are three alternating current lines 1, 2, 3 in the example of FIG. 2, the distance between consecutive transversely extending sections of any of the lines 1, 2, 3 is one third of the distance $T_P$. However, this does not apply to parts of the transition zones at the opposite ends. On the left hand side in FIG. 2, where the lines 1, 2, 3 are connected to an external device, such as an inverter, the distance between the first transversely extending sections of lines 1, 2 is two thirds of the distance $T_P$. At the end of the segment on the right hand side of FIG. 2, the distance between the last transversely extending sections of lines 2, 3 is also two thirds of the distance $T_P$. The reason for this increased distance is that it shall be possible to maintain the repeating sequence of phases of the alternating current, even in the transition zones of two consecutive segments.

In particular, a consecutive segment may be arranged on the left hand side of FIG. 2. In this case, an alternating current line 3' of this consecutive segment comprises a transversely extending section 5' which is placed in the middle between the first transversely extending sections of lines 1, 2. If this line 3' is operated in phase with line 3, the repeating sequence of phases is maintained in the transition zone. "In phase" means that the current carried by the transversely extending section 5' has the same amount at the same point in time, but the direction of the current through the transversely extending section 5' is opposite to the direction of the current through the transversely extending section 5a.

Similarly, there may be a further consecutive segment in the area on the right hand side of FIG. 2, wherein a transversely extending section (not shown in FIG. 2) of a line may be placed in the middle between the last transversely extending sections of lines 2, 3.

As mentioned above, the view shown in FIG. 2 is a schematic view. This applies to the connecting sections of lines 1, 2, 3 which connect the transversely extending sections 5 of the lines 1, 2, 3. The connecting sections are shifted in lateral direction (the vertical direction in FIG. 2), so that the meandering path of the individual lines 1, 2, 3 can be followed. In practice, it is preferred to place the connecting sections "in line" with each other in the opposite side margins of the conductor arrangement. In FIG. 2, these side margins extend from left to right at the opposite sides A, B of the arrangement.

Figure 6:
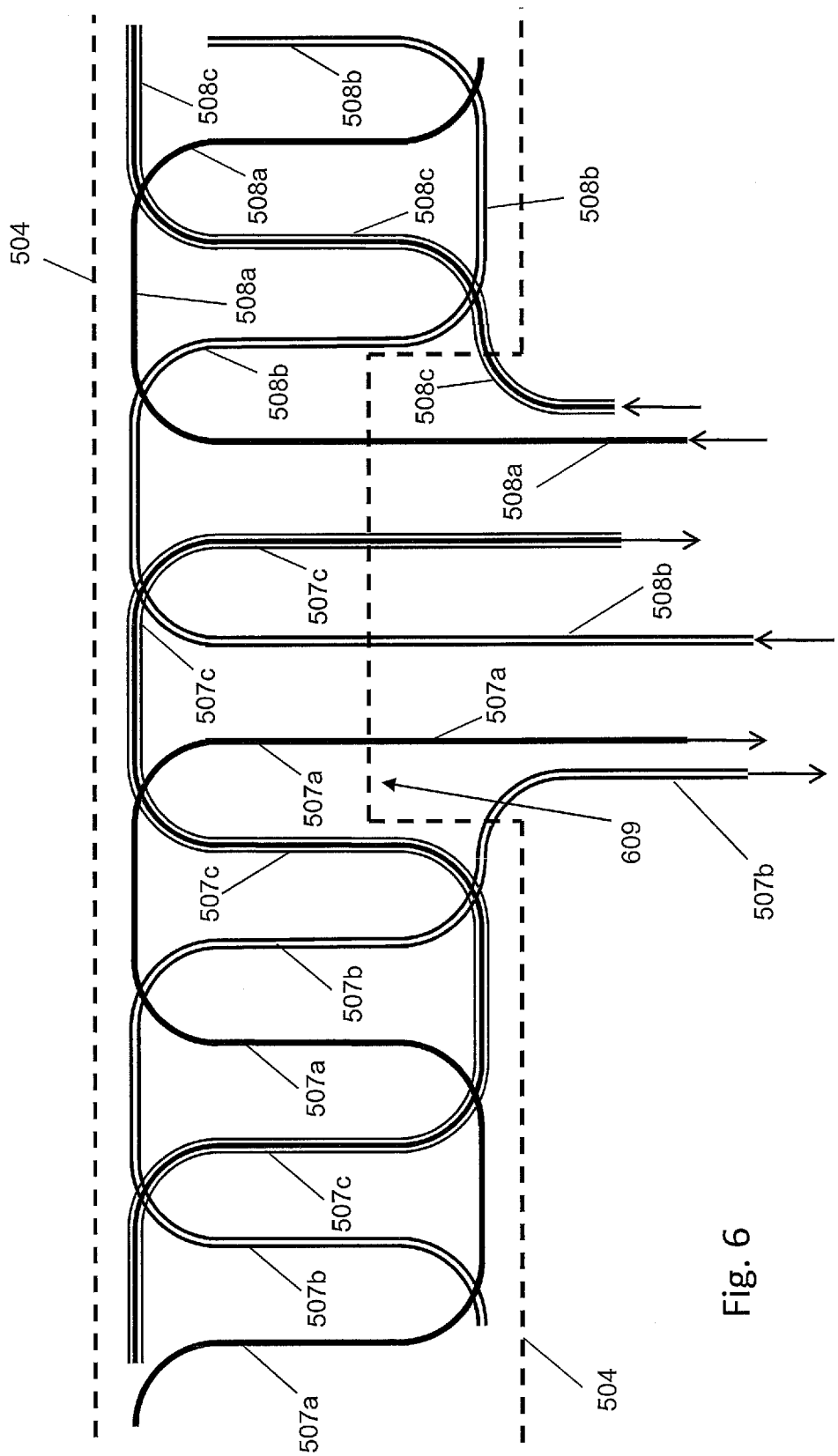
Figure 7:
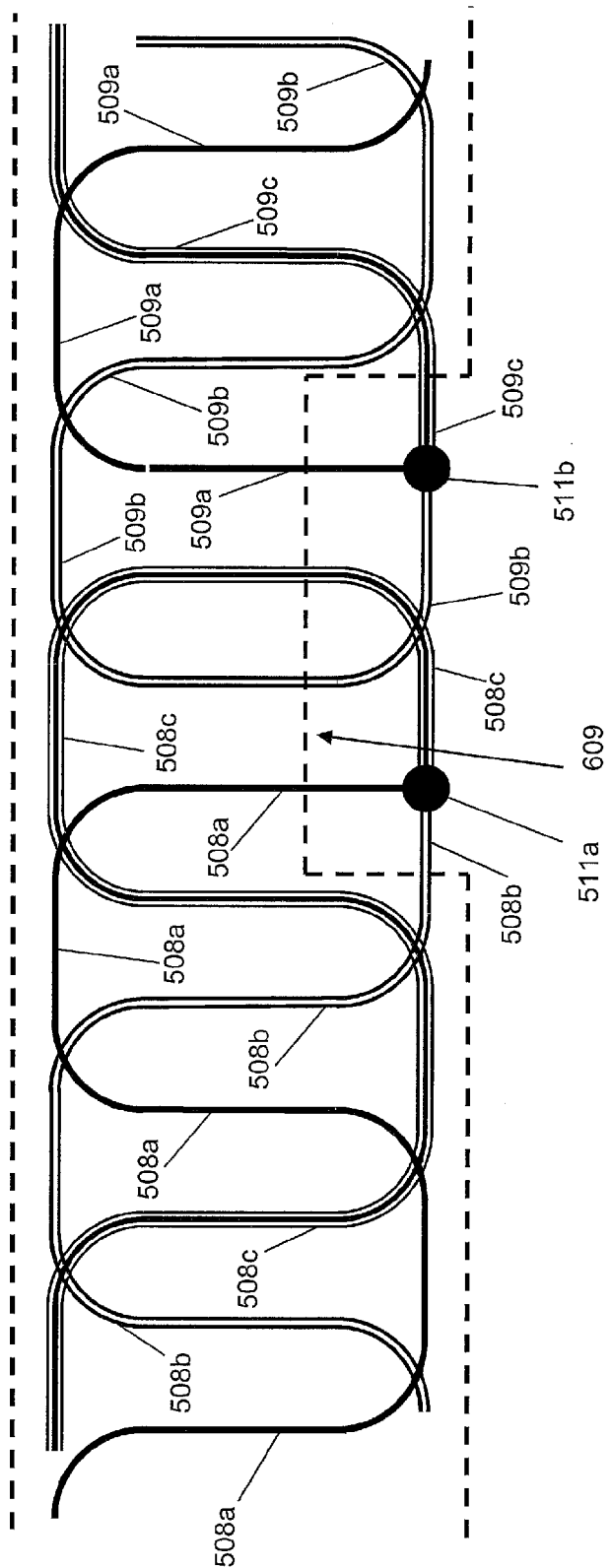

In the schematic view of FIG. 2, some of the connecting sections of line 1 are denoted by 7, some of the connecting sections of line 2 are denoted by 8 and some of the connecting sections of line 3 are denoted by 9. Since these connecting sections 7, 8, 9 are represented by straight lines, they could be shifted in two narrow side margins having the width of a line. However, this requires that the intersection between a transversely extending section and a connecting section forms a sharp edge. In practice, such sharp edges are not preferred, since it would exercise stress forces to the lines and since connecting sections of different lines 1, 2, 3 would extend in parallel to each other. Therefore, an arrangement as schematically indicated in FIG. 6 and FIG. 7 is preferred, wherein the connecting sections are curved, starting at the intersections to the transversely extending sections.

The arrangement of the transversely extending sections in the transition zones of two consecutive segments, as described above, allows for a homogeneous electromagnetic field over the whole extension of the two consecutive segments, including the transition zone. In addition, the arrangement shown in the transition zone on the left hand side of FIG. 2, wherein a transversely extending section of the consecutive segment is arranged in between transversely extending sections of lines 1, 2 of the segment, saves space in the side margins, where the connecting sections are placed. The meandering paths of the lines 1, 2, 3 can be mapped on each other by shifting the paths by two third of the distance $T_P$. Therefore, parallel extending connecting sections can be avoided as far as possible. If the lines would be arranged so that they can be mapped on each other by just one third of the distance $T_P$, connecting lines of the three different alternating current lines 1, 2, 3 would extend in parallel to each other in some regions of the arrangement. It should be noted that the term "mapped on each other" does not refer to the end regions of the lines, i.e. the transition zones to the consecutive segments.

Figure 3:
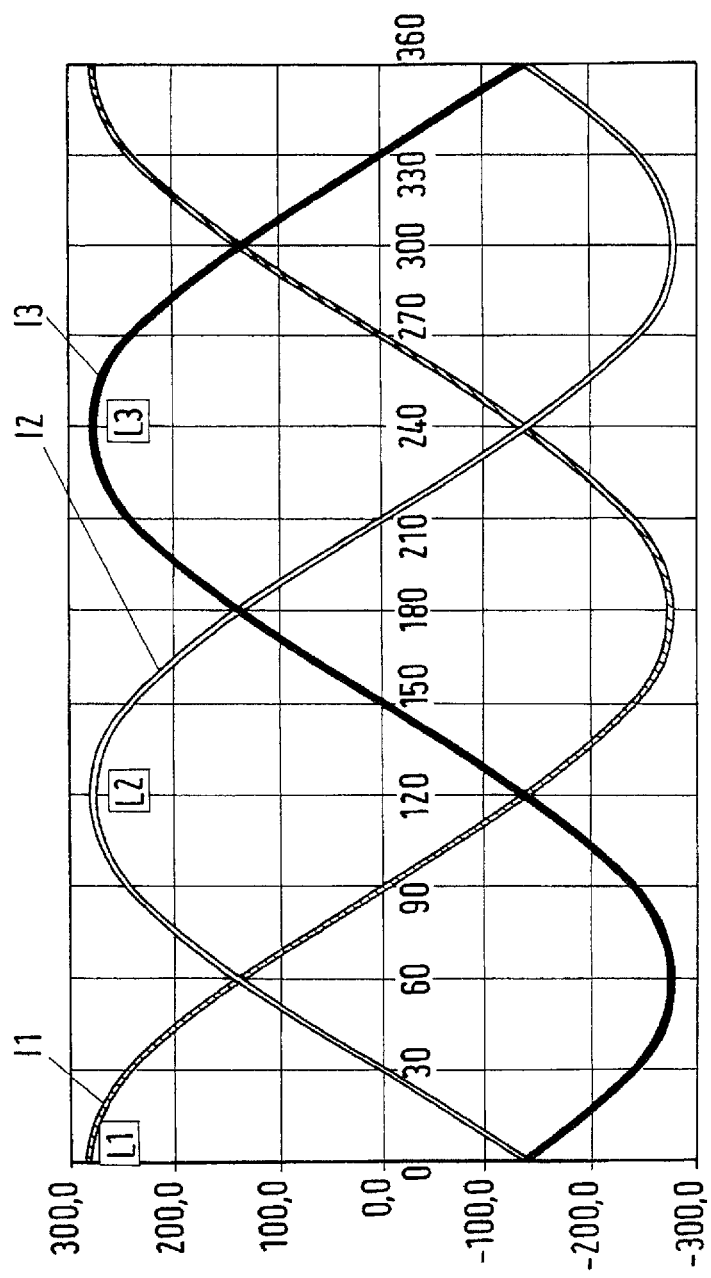

The diagram shown in FIG. 3, depicts the currents through the phases 1, 2, 3 of FIG. 2 at an arbitrary point in time. In the horizontal direction, the phase angle varies. The peak current value of the currents may be in the range of 300 A respectively −300 A (vertical axis). However, greater or smaller peak currents are also possible. 300 A peak current is sufficient to provide propulsion energy to a tram for moving the tram along a track of some hundred meters to a few kilometers, for example within the historic town centre of a city. In addition, the tram may withdraw energy from an on-board energy storage, such as a conventional electrochemical battery arrangement and/or a super cap arrangement. The energy storage may be charged again fully, as soon as the tram has left the town centre and is connected to an overhead line.

Figure 4:
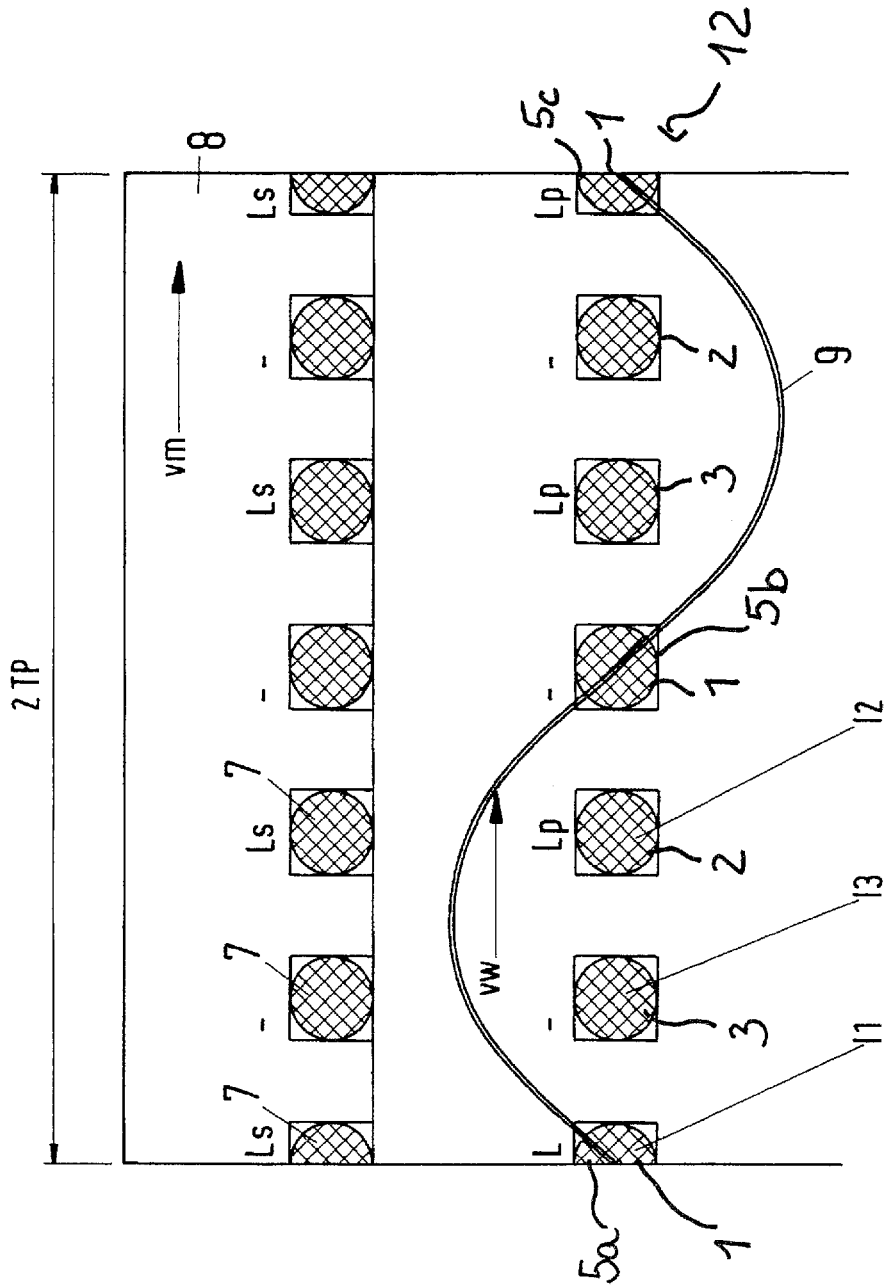

FIG. 4 shows a cut along a cutting plane which extends vertically and which extends in the travel direction. The wires or bundles of wires of lines 1, 3, 2 which are located in sections of the lines 1, 3, 2 which extend transversely to the direction of travel are shown in the lower half of FIG. 4. In total, seven sections of the arrangement 12 which extend transversely to the travel direction are shown in FIG. 4, at least partially. The first, fourth and seventh section in the row (from left to right) belong to line 1. Since the direction of the current I1 through section 5b (the fourth section in FIG. 4) is opposite to the direction of the current I1 through the sections 5a, 5c (the first and the seventh section in FIG. 4), and since the currents I1, I3, I2 are alternating currents, the produced electromagnetic wave is moving in the direction of travel at a speed vw. The wave is denoted by 9, the inductivity of the arrangement 12 by Lp.

The cross sections shown in the upper half of FIG. 4 represent a receiving device of a vehicle which is travelling in the direction of travel and at a speed vm and at the top of FIG. 4 "2 TP" indicates that FIG. 4 shows a line segment of arrangement 12, the length of which is equal to twice the distance between the consecutive transversely extending sections of a line, here line 1.

Figure 5:
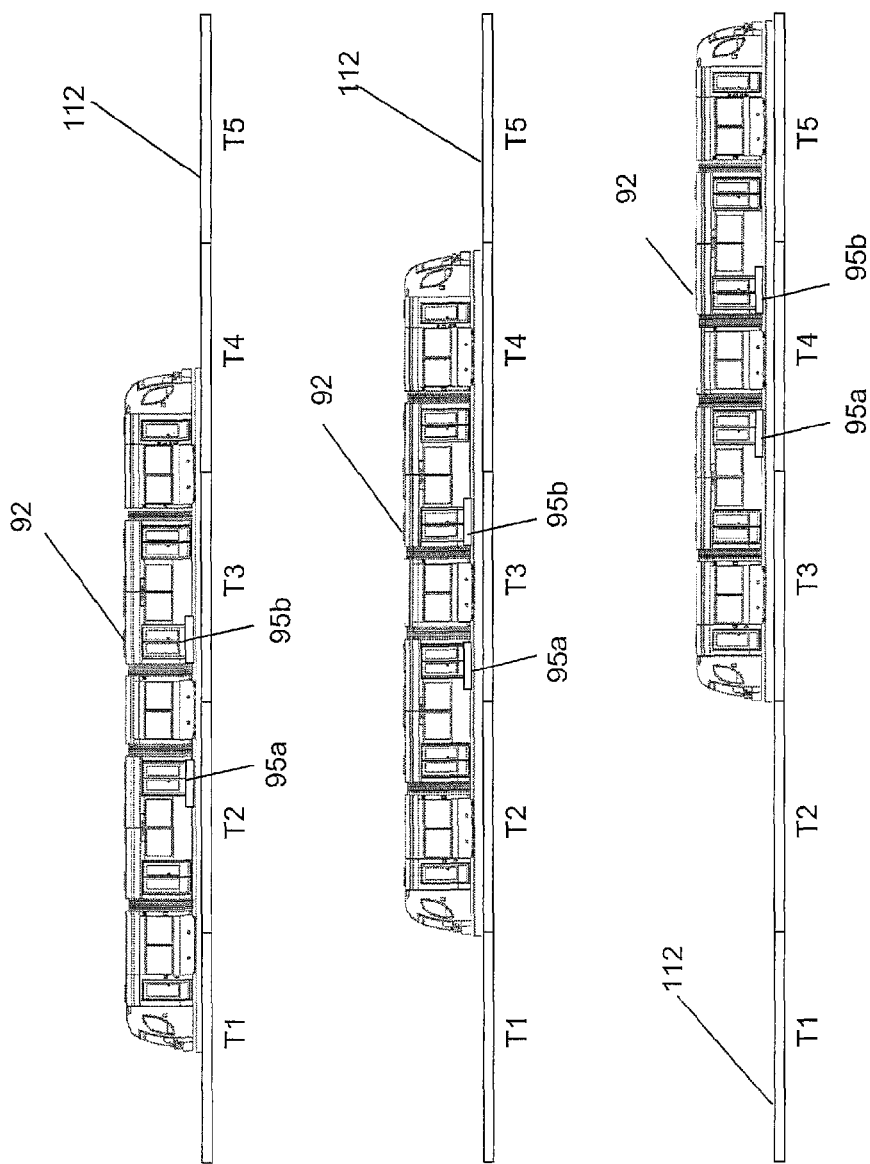

According to the examples shown in FIG. 5, a vehicle 92 (e.g. a tram) is moving from the left to the right. In the upper view, the vehicle 92 occupies the track above segments T2, T3 and partly occupies the track above segments T1 and T4. The receiving devices 95a, 95b are located always above segments which are fully occupied by the vehicle. This is the case, because the distance between the receiving devices to the nearest end of the vehicle in lengthwise direction is greater than the length of each segment of the conductor arrangement 112.

In the situation of the upper view, the segments T2, T3 are operated and all other segments T1, T4, T5 are not operated. In the middle view, where the vehicle 92 fully occupies the track above segments T2, T3 and nearly fully occupies the track above segment T4, operation of segment T2 has been stopped, because the receiving devices 95a has already left the region above segment T2, and segment T4 will start operation as soon as the vehicle fully occupies the region above the segment T4. This state, when the segment T4 is switched on is shown in the lower view of FIG. 5. However, in the meantime segment T3 has been switched off.

FIG. 6 shows a transition zone of two consecutive segments. The conductor arrangement 507a, 507b, 507c; 508a, 508b, 508c is a three-phase conductor arrangement, i.e. each of the two segments of the conductor arrangement shown in FIG. 6 comprises three phase lines for conducting three phases of a three phase alternating electric current. One of the three phases is indicated by a single line, the second of the three phases is indicated by a double line and the third of the three phases is indicated by a triple line. All electric lines are extending in a meandering manner in the direction of travel (from left to right or vice versa).

Each segment can be operated separately of each other, but the segments can also be operated simultaneously. FIG. 6 shows a preferred embodiment of a basic concept, namely the concept of overlapping regions of the consecutive segments.

The segment shown on the left hand side in FIG. 6 comprises phase lines 507a, 507b, 507c. Following the extension of these phase lines 507, from left to right, each phase line 507 which reaches a cut-out 609 (indicated by a recess of the dashed outline of the track, which may be physical cut-out of a block carrying the lines) is conducted away from the track towards an inverter (not shown) for operating the phase lines 507. For example, phase line 507b reaches cut-out 609 where the cut-out 609 ends. In contrast to phase line 507b, phase lines 507a, 507c reach the cut-out 609 with a line section which extends from the opposite side of the line of shaped blocks towards the cut-out 609.

Each of the three phase lines 507 comprises line sections which extend transversely to the direction of travel. These transversely extending sections form a repeating sequence of phases in the direction of travel, i.e. a section of the first phase line 507a is followed by a section of the second phase line 507b which is followed by a line section of the third phase line 507c and so on. In order to continue with this repeated sequence of the phase lines in the transition zone, a phase line 508b (the second phase line) of the neighbouring segment is conducted through the cut-out 609 so that it forms a transversely extending line section in between the first phase line 507a and the third phase line 507c of the other segment where they reach the cut-out 609. In other words, the second phase line 508b of the second segment replaces the second phase line 507b of the first segment in order of the phases to continue with the repeated sequence of phase lines. The other phase lines of the second segment, namely the first phase line 508a and the third phase line 508c are conducted through cut-out 609 in a corresponding manner so that the sequence of phases, if the extension in the direction of travel is considered, is the same as for the first segment on the left hand side of FIG. 6.

FIG. 7 shows a second type of a transition zone of two consecutive segments, for example also located in a cut-out 609 of the track. Same reference numerals in FIG. 6 and FIG. 7 refer to the same features and elements. FIG. 7 shows, for example, the segment shown on the right hand side in FIG. 6 and a further segment of the conductor arrangement. The phase lines of this further segment are denoted by 509a (first phase line), 509b (second phase line) and 509c (third phase line) of the further segment. The area of the cut-out 609 is used as an area for establishing electric connections between the three phases of each segment, i.e. a star point connection (see FIG. 2) is made for each segment. The star points are denoted by 511a or 511b. Preferably, the location of the star point 511 is at a greater distance to the upper surface of the cover layer than the line sections of the phase lines where the phase lines are located within the recesses or spaces which are defined by the shaped blocks. Therefore, the star point connections are well protected.

The concepts described in connection with FIGS. 6 and 7 can be combined with the synchronization according to the present invention in order to produce a continuous electromagnetic field (in particular a continuously moving wave, see FIG. 4) at the transition zones of consecutive segments which are operated at the same time.

The arrangements shown in FIG. 6 and FIG. 7 are preferred compared to the arrangement shown in FIG. 2 with respect to the shape of the connecting sections which connect the transversely extending sections. The connecting sections comprise curves at the intersections to the transversely extending section. Therefore, it is possible that connecting sections on the same side of the track do not extend in parallel to each other at all. Rather, some connecting sections cross each other, if view from the top.

The arrangement of FIG. 8 comprises a direct current supply 4 having a first line 4a at a first electric potential and a second supply line 4b at another electric potential. A power source S is connected to the lines 4a, 4b. Each segment T comprises a plurality of lines (in particular three lines) for carrying a separate phase of an alternating current. The alternating current is generated by an associated inverter K1, K2, K3, K4, K5, K6, which is connected to the direct current supply 4 at its direct current side. In the arrangement shown in FIG. 2 there is one inverter K per segment T. It should be noted that the inverters K are located in pairs nearby each other at the transition zones of consecutive segments, according to the concept of FIGS. 6 and 7. The current supply of FIG. 8 is a direct current supply connecting a central power source S with individual inverters. However, this principle can be modified, according to FIGS. 9 and 10.

Figure 9:
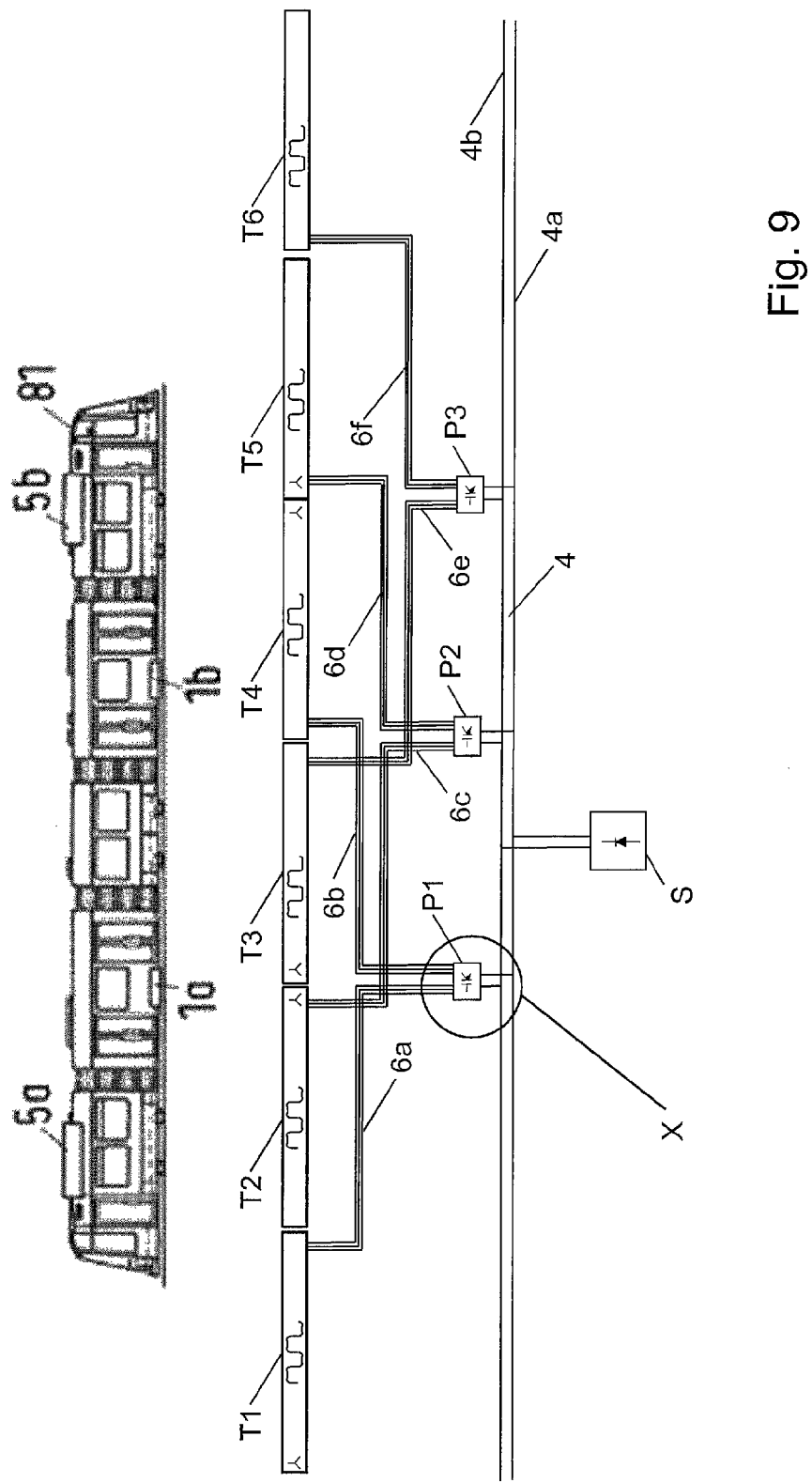

According to FIG. 9, a plurality of inverters is connected in parallel to each other with a direct current supply 4 having lines 4a, 4b. However, in contrast to the arrangement shown in FIG. 8, the inverters P1, P2, P3 are connected to a plurality of alternating current supplies and each of these supplies connects the inverter P with one segment T. According to the specific embodiment shown in FIG. 9, each inverter P is connected to two segments T1, T4; T2, T5; T3, T6. As schematically indicated by the length of the vehicle 81 traveling along the segments T, only one segment T1, T2, T3 or T4, T5, T6 of the pairs of segments T is operated while the vehicle is traveling in the position shown in FIG. 9. Segments T2, T3, T4 are operated in order to transfer energy to the receivers 95a, 95b of vehicle 81. Operation of segments T1, T5, T6 would not result in a significant energy transfer to the vehicle 81. If the vehicle continues traveling from left to right in FIG. 9, segment T2 will be switched off and segment T5 will be switched on instead.

As a result, only one of the segments of a pair of segments T which is connected to the same inverter P will be operated at a time. Therefore, it is possible to combine the inverter with a constant current source which is adapted to produce a desired constant current through a single segment. In alternative arrangements, it would be possible, for example, to connect more than two segments to the same inverter and to operate only one of these segments at a time.

Figure 10:
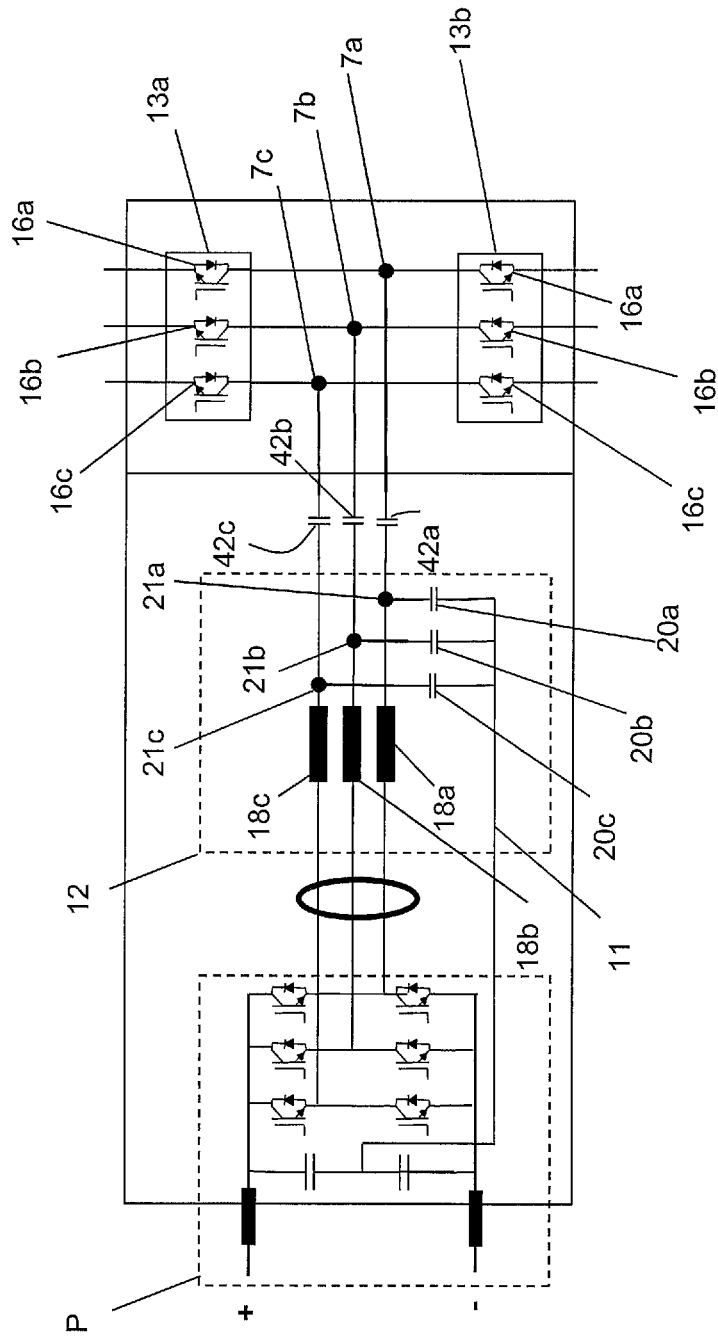

FIG. 10 shows a module comprising an inverter P which may be constructed as known to a skilled person. For example, in case of a three-phase alternating current to be produced, there may be bridges comprising a series connection of two semiconductor switches for each phase. Since the construction of inverters is known, the details are not described with reference to FIG. 10. On the alternating current side, the inverter P is connected to a constant current source 12. This constant current source 12 consists of a network of passive elements, namely one inductance 18a, 18b, 18c in each phase line of the alternating current and one capacitance 20a, 20b, 20c in a connection which connects one of the phase lines starting at a junction 21a, 21b, 21c to a common star point 11.

The constant current source may also comprise a second inductance in each phase line which is located at the opposite side of the junction 21 as the first inductance 18. Such an arrangement can be called a three-phase T-network. The purpose of the second inductance is to minimize the reactive power produced by the segment which is connected to the constant current source.

In the example shown in FIG. 10, the phase lines of the constant current source 12 are connected to junctions 7a, 7b, 7c via a second capacitance 42a, 42b, 42c. The capacitances 42 serve to compensate the inherent inductances of the segments which can be connected to the junctions 7. "Compensation" in this case means the reactive power produced by the respective segment is minimized while the segment is operated. This illustrates the principle that the compensating capacitance can be integrated in the module which also comprises the constant current source.

In the example shown in FIG. 10, a first switching unit 13a comprising semiconductor switches 16a, 16b, 16c, one in each phase line, is connected to the junctions 7a, 7b, 7c and in a similar manner the semiconductor switches 16a, 16b, 16c of a second switching unit 13b are also connected to the junctions 7. For example, the first switching unit 13a may be connected to the alternating current supply 6a, 6c or 6e of FIG. 9 and the second switching unit 13b may be connected to the alternating current supply 6b, 6d or 6f of FIG. 9.

If operation of the consecutive segments T1 to T6 of FIG. 9 should start operation one after the other, the operation of the assigned inverters P1 to P3 will start in the (logical) sequence P1-P2-P3-P1-P2-P3, but the switching unit 13a will be switched off after the inverter operation has ceased for the first time during this sequence and the switching unit 13b will be switched on. Synchronization signals can be output by the inverters to the consecutive inverter according to this logical sequence, for example using corresponding addresses of a digital data bus.

Figure 11:
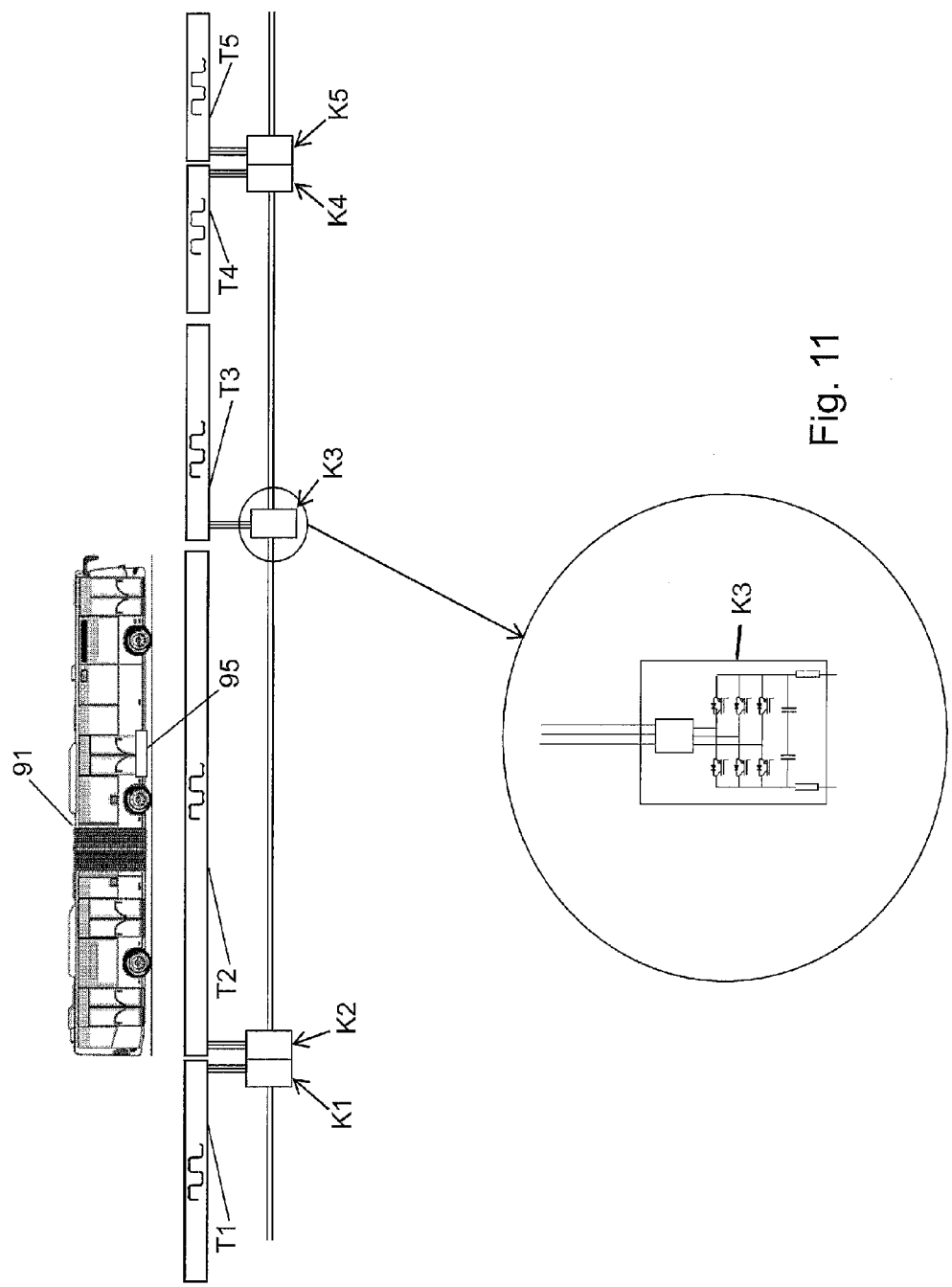

FIG. 11 schematically shows a vehicle 91, in particular a bus for public transport of people, comprising a single receiver 95 for receiving the electromagnetic field produced by segments on the primary side of the system. There are five consecutive segments T1, T2, T3, T4, T5 which differ with respect to the lengths in the direction of travel (from left to right in FIG. 11). At the transition zone of segment T1 to segment T2 as well at the transition zone of segment T4 to segment T5, there are two inverters K1, K2; K4, K5, whereas at the transition zone of segment T2 to segment T3 there is only the inverters K3 assigned to segment T3. An enlarged view of inverter K3 is shown in the bottom left of the figure.

The effective alternating voltage of the alternating current produced by the inverters (of any embodiment of this description) may be, for example, in the range of 500-1.500 V. The frequency of the alternating current may be in the range of 15-25 kHz.

Figure 12:
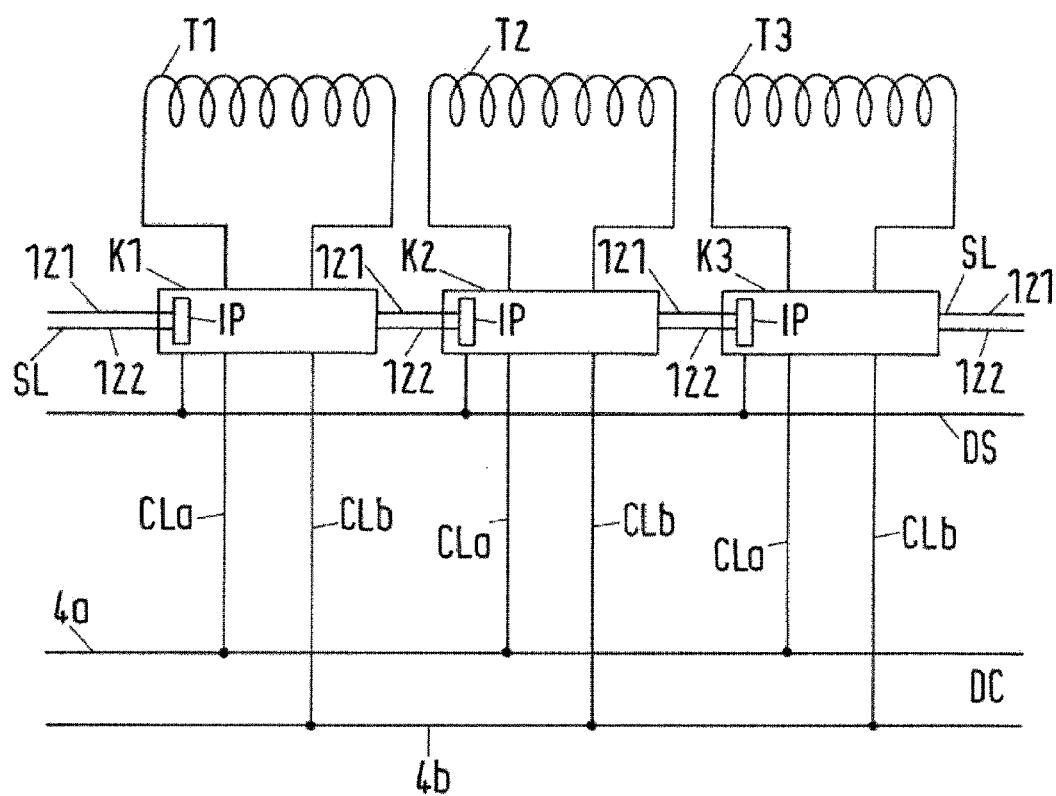

In the example shown in FIG. 12, three consecutive segments T1, T2, T3 are depicted. However, the conductor arrangement may comprise any other number of segments which form a sequence of consecutive segments. In particular, the number of segments in practice may be larger, for example at least ten or twenty segments. The alternating current line or alternating current lines of the segments T1, T2, T3 are represented by a single line per segment, which comprises windings in order to indicate the inductivity which is required for inductive energy transfer. The alternating current line(s) is/are connected to the assigned inverter K1, K2, K3. The inverters K are connected to the direct current supply via connection lines CLa, CLb. The direct current supply comprises a first line 4a and a second line 4b at different electric potentials. The first line 4a is electrically connected via the first connection lines CLa to the inverters K and the second line 4b of the direct current supply is connected via the second connection lines CLb to the inverters K.

Furthermore, FIG. 12 shows a synchronization link SL which may be realized by a digital data bus, such as a data bus according to the CAN (controller area network)-bus-standard. The synchronization link SL is connected to the respective inverter K at an interface IP of the inverter K.

Optionally, an additional direction selection line may be provided and, in particular, may be connected to the interface IP of each inverter K, in order to enable direction selection with respect to the direction which defines the order of the sequence of consecutive segments T and, correspondingly, the order of the sequence of assigned inverters K. However, the direction selection line DS can be omitted, in particular if vehicles always travel in the same direction on the track which is provided with the conductor arrangement.

In the following, an example of the operation of the consecutive segments will be given. For example, a vehicle which always covers two consecutive segments while it is driving on the track is to be provided with energy. In this one, two or temporarily three consecutive segments may be operated at the same time. However, the description is not limited to the operation of two or three consecutive segments. Rather, any other number of consecutive segments may be operated at the same time.

If, for example, the direction of the order of the sequence of consecutive segments T is from left to right in FIG. 12, i.e. the order is T1-T2-T3, an active inverter T (i.e. an inverter which is operating and is therefore producing an alternating current in the respective corresponding segment T) outputs a synchronization signal to the consecutive inverter K. If, for example, inverter K1 is operating, it outputs a synchronization signal via the synchronization link SL to the consecutive inverter K2. If inverter K2 is operating, it outputs a synchronization signal to consecutive inverter K3. However, if inverter K is not operating, it does not output a synchronization signal to the consecutive inverter K.

As a result, a sequence of consecutive inverters K which are operated at the same time forms a chain, wherein each chain link (i.e. each inverter K) outputs a synchronization signal to the consecutive chain link. Therefore, synchronized operation of the inverters K is guaranteed. On the other hand, since the last chain link does not output a synchronization signal, other inverters which are not part of the same sequence of consecutive inverters, can also operated, but are not synchronized or are synchronized with another sequence of consecutive inverters. In other words, there may be separate chains of active inverters and the synchronization method described above guarantees that the inverters of each individual chain of active inverters are operated synchronously.

If a direction selection line is present as shown in FIG. 12, the direction for transferring the synchronization signal to the consecutive inverter K can be reversed on receipt of a direction selection signal by the respective interfaces IP. For example, the receipt of a corresponding direction selection signal via the direction selection line SL may cause the active inverter K3 to output a synchronization signal to the new consecutive inverter K2 and so on.

Figure 13:
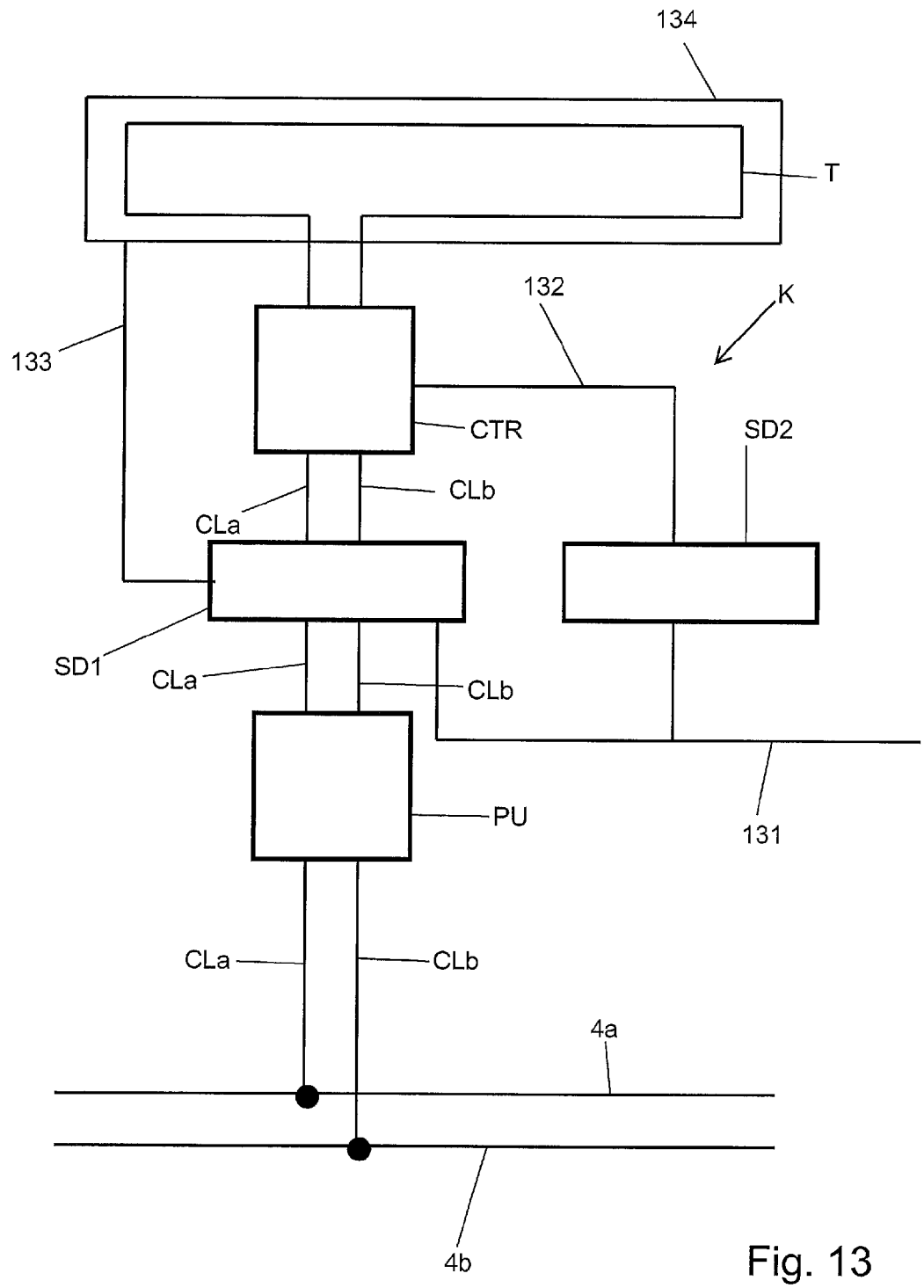

FIG. 13 shows a possible embodiment of an inverter, for example one of the inverters shown in FIG. 1, FIG. 8, FIG. 10, FIG. 11 or FIG. 12. The controller or a plurality of controllers of the inverter is/are denoted by CTR. Furthermore, the inverter comprises a power unit PU for providing the required form of electrical power to the inverter. In the specific embodiment shown in FIG. 13, the inverter also comprises two starting devices SD1, SD2. However, instead of two separate starting devices, the inverter may alternatively comprise a single starting device which combines the functions of the two starting devices SD1, SD2 which will be explained in the following.

The starting devices SD1, SD2 are connected to a signal line 131, which may be the same signal line or same combination of signal lines which is used as synchronization link (for example as explained in connection with FIG. 12). Alternatively, the signal line 131 may be an internal signal line for connecting the different starting devices SD1, SD2 and may be omitted, if there is a single starting device only. However, it is preferred that the starting device or starting devices are connected to an external device via the signal line 131 or via another signal line, so that the starting device(s) can be enabled or disabled by the external device (which may be a central control unit of the system) for providing energy to vehicles.

As shown in FIG. 13, it is preferred that the starting device SD1 (or alternatively all starting devices or the single starting device) is connected to a detection arrangement 133, 134 for detecting the presence of a vehicle. In the embodiment shown in FIG. 13, it is schematically indicated, that the area which is covered by the vehicle presence detection (as outlined by dashed line 134) covers the whole area of the alternating current line(s) of the segment T which is/are connected to the inverter K. However, vehicle presence detection can be performed in a different manner, for example by detecting that a vehicle has reached or passes a pre-defined position on the track. If the vehicle presence detection system 133, 134 produces a signal indicating that the operation of the inverter K should be started (for example by transferring a signal from loop 134 via signal line 133) the first starting device SD1 (or the single starting device) switches on the power supply of the inverter K. In the specific embodiment shown in FIG. 13, this is performed by closing a switch or by closing switches in the connection lines CLa, CLb, so that the controller CTR is connected to the power unit PU. This power unit PU may be omitted if, for example, voltage and current of the direct current supply are suitable for operation of the inverter K without an additional power unit PU. However, it is preferred to use such a power unit PU and, in particular, to use the same direct current supply for operational power of the different units of inverter K and, at the same time, for providing the energy to the alternating current line(s) of the corresponding segment T. A corresponding example is shown by FIG. 14.

Starting the power supply of the controller CTR does not start full operation of the inverter K. In other words, starting the power supply of the controller CTR does not start the generation of the alternating current which is used to operate the corresponding segment T. Rather, this full operation is started only after a delay or is started if it is detected that the power supply of the controller CTR has become stable. "Stable" means that the power supply does not cause fluctuations of the alternating current which is produced by the inverter K.

If the pre-defined delay period has elapsed, or if is detected that the power supply has become stable, the second starting device SD2 (or the single starting device) enables full operation of the inverter K, for example by outputting a corresponding enabling signal via signal line 132.

Figure 14:
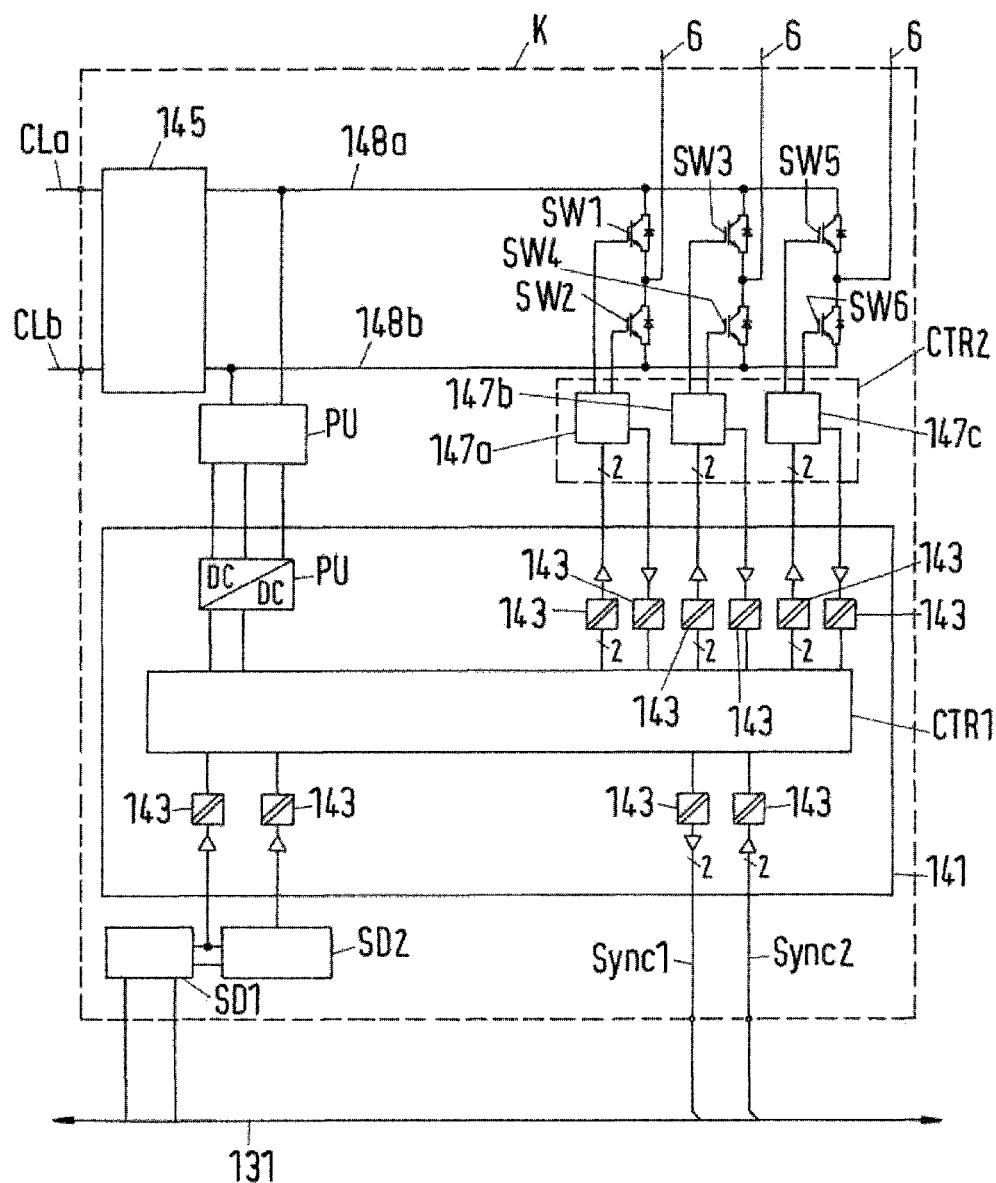

FIG. 14 shows an inverter K, for example the inverter of FIG. 13. Inverter K comprises a first controller CTR1 and a second controller arrangement CTR2 comprising three drive units 147a, 147b, 147c for controlling the switching operations for six switches SW1 ... SW6. These switches SW (for example semiconductor switches, such as IGBTs) and their operation are principally known in the art. The production of a three-phase alternating current through alternating current lines 6 of the corresponding segment (not shown in FIG. 14) will not be described in detail here. Series connections of in each case two of the switches SW1, SW2; SW3, SW4; SW5, SW6 are connected at their opposite ends to the direct current lines 148a, 148b that are connected to the connection lines CLa, CLb via a protection and filter unit 145. The power unit PU (which may be a distributed unit comprising two sub-units, as shown in FIG. 14) is also connected to the direct current lines 148 and provides the first controller CTR1 with power, provided that the first starting device SD1 has switched on the power supply of the first controller CTR1. Furthermore, the power unit PU also provides the second arrangement of controllers (i.e. the drive unit 147) with electrical power, if the second starting device SD2 has switched on the power supply of the second controller arrangement CTR2. For simplicity, the control connections of the starting devices SD1, SD2 are not or not completely shown in FIG. 14.

The first controller CTR1 has several connections to units denoted by 143 which are input or output units for inputting or outputting signals to/from the first controller CTR1. For example, the first controller CTR1 and the units 143 are provided on a common board 141. However, other embodiments are also possible.

The signal line 131 at the bottom of FIG. 14 is used for transferring synchronization signals and for transferring signals to/from the first starting device SD1, such as a vehicle detection presence signal. The signal line 131 may be a digital data bus optionally comprising an additional direction selection signal line as mentioned above.

The first controller CTR1 is adapted to control the operation of the drive units 147 based on the synchronization which is effected by a synchronization signal that is received via the synchronization link Sync2. During operation of the second controller arrangement CTR2 (i.e. during operation of the drive units 147 and, therefore, during generation of the alternating current carried by alternating current lines 6) the first controller CTR1 outputs a synchronization signal via synchronization link Sync1, preferably towards the consecutive inverter only. If the inverter K does not receive a synchronization signal, the first controller CTR1 controls the operation of the drive units 147 without the presence of a synchronization signal which is received from the exterior. However, it outputs a synchronization signal in any case during operation of the drive units 147.

In the absence of a vehicle presence detection signal or if a vehicle absence signal, which may be received by the first starting device SD1 via signal line 131, indicates that the operation of the inverter K should stop, the first starting device SD1 switches off the power supply of the controllers CTR1, CTR2.

Figure 15:
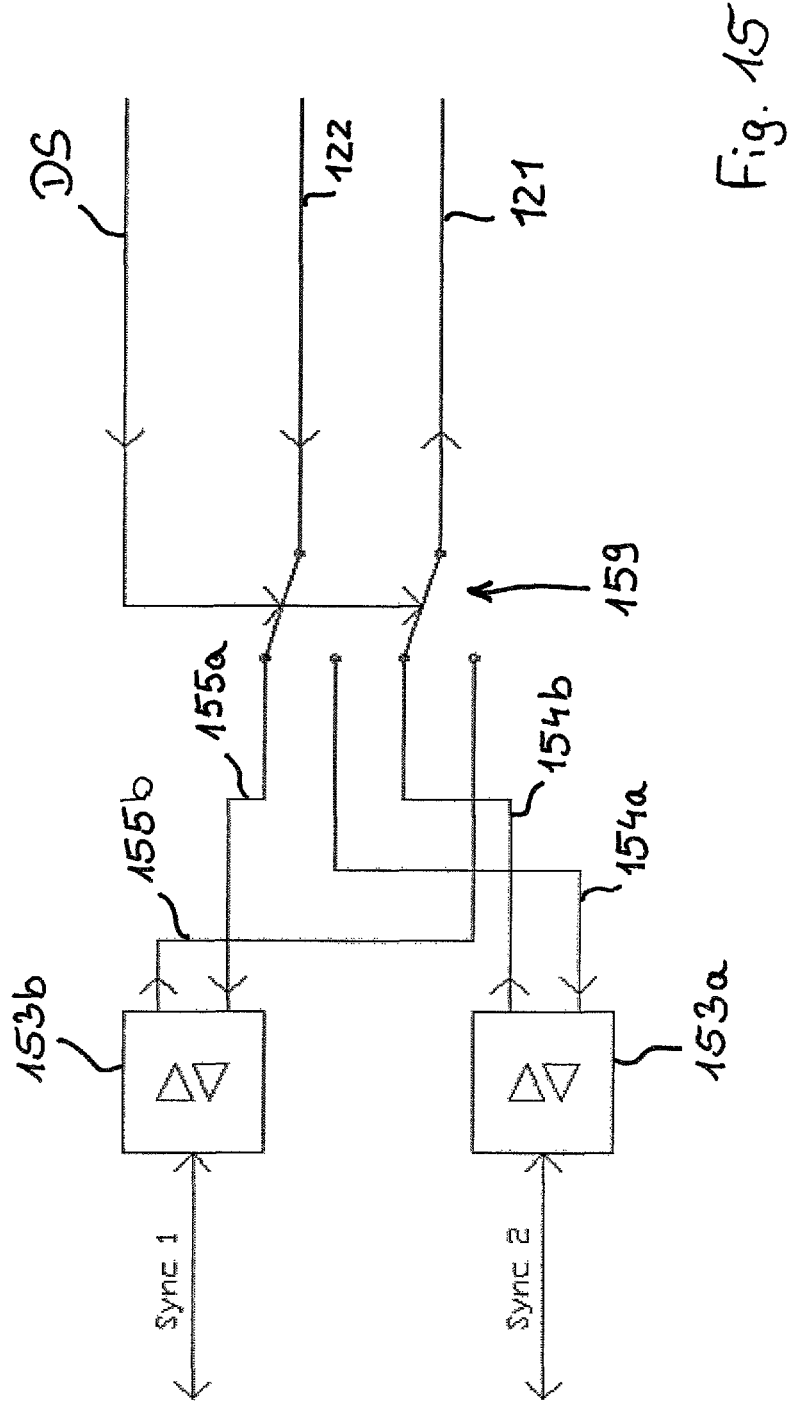

FIG. 15 shows a signal interface. On the left hand side of FIG. 15, there are two synchronization links Sync1, Sync2 from the interface to the inverter (not shown in FIG. 15). These lines Sync1, Sync2 may be the lines shown at the bottom, right hand side of FIG. 14. Each of the synchronization signal lines Sync1, Sync2 terminates at an input/output unit 153a, 153b which may be used alternatively for inputting or outputting the respective synchronization signal to the inverter or from the inverter.

On the right hand side of FIG. 15, two lines 121, 122 of a signal line (such as the signal line 131 of FIG. 13 or FIG. 14 or the signal line SL of FIG. 12) are shown. In the operating state depicted by FIG. 15, the first line 121 is connected via first contacts of a switch 159 and via a connection line 154b to the input/output unit 153a at synchronization line Sync2. Furthermore, the second signal line 122 is connected via second contacts of the switch 159 via connection line 155a to the other input/output unit 153b at the other synchronization line Sync1. Therefore, a synchronization signal which is received via the second line 122 is transferred via synchronization line Sync1 to the inverter. On the other hand, a synchronization signal which is output by the inverter via synchronization line Sync2 transferred via the first signal line 121, in particular to the consecutive inverter, according to the present order of the sequence of consecutive inverters.

On receipt of a corresponding direction selection signal via line DS, the switch 159 switches to a different operating state, in which the first signal line 121 is connected via first contacts of the switch 159 and via a connection line 155b to input/output unit 153b where the first synchronization line Sync1 terminates. In addition, the second signal line 122 is connected via second contacts of the switch 159 and via a connection line 154a with the other input/output unit 153a, where the second synchronization line Sync2 terminates. During operation of the inverter, a synchronization signal which is received via the second signal line 122 is therefore transferred via the second synchronization line Sync2 to the inverter. On the other hand, a synchronization signal which is output by the inverter is transferred via the first synchronization line Sync1 to the first signal line 121.

In particular, input/output units 153 can be adapted in such a manner that synchronization signals which are output by the unit 153 are addressed to a pre-defined inverter. Therefore, a synchronization signal which is output by unit 153a will always be transferred to a specific inverter which is the consecutive inverter with respect to a first direction of the order of sequence of consecutive inverters. A synchronization signal which is output by the other unit 153b will always by addressed to a second specific inverter which is the consecutive inverter according to the opposite direction of the order of sequence of consecutive inverters. In both cases, the first signal line 121 is used to transfer the respective synchronization signal.

Figure 16:
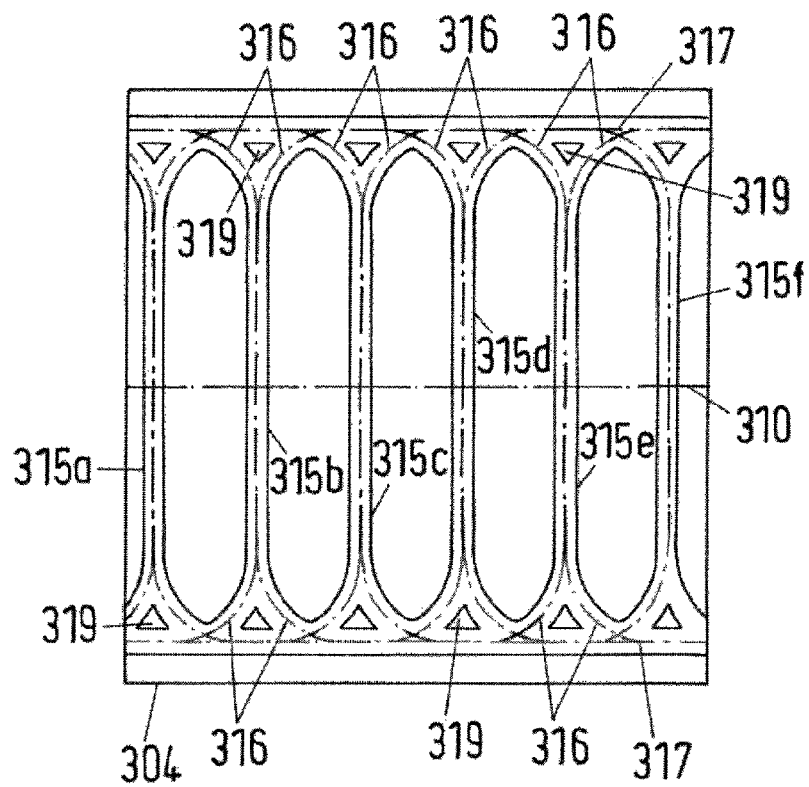

FIG. 16 shows a top view of a shaped block. The block 304 comprises six recesses 315a-315f which extend perpendicularly to a centre line 310 which divides the block 304 in two halves. The centre line 310 extends in the direction of travel of a vehicle, if the block 304 forms parts of a track for the vehicle.

The recesses 315 are parallel to each other and are arranged within the same horizontal plane which is parallel to the image plane of FIG. 16. The recesses 315 extend in width direction (the vertical direction in FIG. 1) over about three quarters of the total width of block 304. They are arranged symmetrically to the centre line 310.

Each recess has a U-shaped cross-section to receive a cable, i.e. an electric line. The dashed lines shown in FIG. 16 which extend along the recesses 315 are centre lines of the recesses 315. At each of the two opposite ends of the straight recesses 315, there a bifurcated curved recess region 316 which forms a transition to a peripheral straight recess 317 extending along the lateral edge of the block 304. Cables can be laid in a manner consecutively extending from the straight recesses 315 through the curved recess region 316 into the peripheral straight recess 317, thereby changing the direction of extension from transversely to the direction of travel (for transversely extending sections of the line) to parallel to the direction of travel.

The curved recess regions 316 allow for placing a cable, which extends through the recess 315 in such a manner that it continues to either the left or the right, if viewed in the straight direction of the recess 315. For example, a cable (not shown in FIG. 16) may extend through recess 315b, may turn to the right—while extending through recess region 316—and may then extend through the straight recess 317 which extends perpendicularly to the recesses 315 on the opposite side of curved recess region 316. There are two peripheral straight recess regions 317 on opposite sides of block 304. The cable may then turn to the right through the recess region 316 at the end of recess 315e and may then extend through recess 315e. At the end of recess 315e, which is shown in the lower part of FIG. 16, the cable may again turn left through recess region 316 into the other straight recess 317. The other recesses 315 may be used for two other cables.

Figure 17:
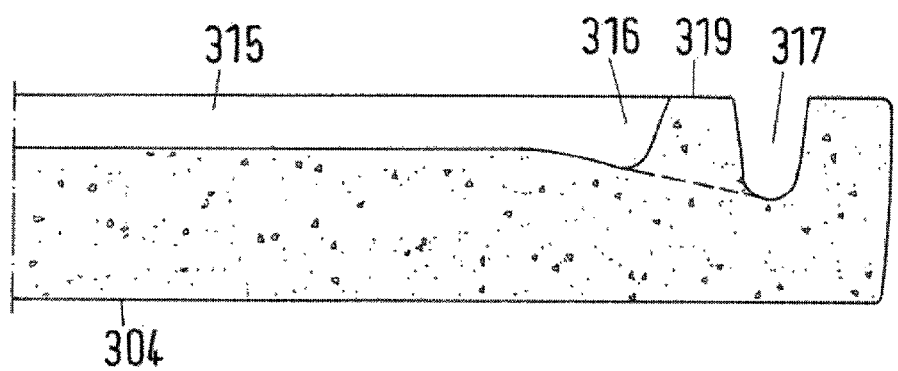

As shown in FIG. 17, the depth of the recesses 315, 316, 317 is different. The depth of recess 315 is sufficient to receive one cable. The depth of the curved recess region 316 increases from the end of recess 315 to recess 317 as indicated by a dashed line in FIG. 2. The bottom profile of the curved recess region 316 is not fully shown in FIG. 2, since the sectional view includes a region 319 of block 304 which is not recessed. Each of the curved recess regions 316 comprises such an island region 319 which is located between the two curved branches of the curved recess region 316. One of the branches extends above the plane of FIG. 17 and the other branch extends below the plane of FIG. 17. In addition, the island region 319 is located between the straight recess 317 and the two branches of the curved recess region 316.

Since the depth of the curved recess region 316 increases towards the straight recess 317, different cables can be laid upon one another. The depth of the straight recess 317 is sufficient to arrange two cables upon one another extending in the same straight direction.

For example, a first cable may extend trough the lower recess 317 in FIG. 16 and may turn left into recess 315b through the recess region 316 shown in the bottom left part of FIG. 16. In addition, a second cable may extend trough recess 315a, may turn into the recess 317, thereby crossing (if viewed from above) the first cable.

The example concerning the extension of cables or electric lines given above refers to one specific application for laying three meandering cables. However, the use of the shaped block 304 shown in FIGS. 16 and 17 is not restricted to this application. Rather, for example, less or more than three cables can be laid using the block 304 shown in FIGS. 16 and 17.

The invention claimed is:

1. A system for transferring electric energy to a vehicle, comprising:
   an electric conductor arrangement for producing an alternating electromagnetic field and for thereby transferring electric energy to a vehicle,
   wherein the conductor arrangement comprises:
   a plurality of consecutive segments electrically connected in parallel to each other and to a current supply, wherein the segments extend in a direction of travel of the vehicle,
   a transition zone between two of the consecutive segments, wherein the two of the consecutive segments follow each other in the direction of travel of the vehicle or follow each other opposite to the direction of travel,
   at least three alternating current lines per segment for carrying phases of a multi-phase alternating current in order to produce the alternating electromagnetic field,
   a plurality of line sections, wherein the alternating current lines of each segment comprise the plurality of line sections and wherein the line sections extend transversely to the direction of travel of the vehicle,
   a plurality of controllers, with a controller for each segment being adapted to control operation of the segment independently of the other segments, wherein the controllers for the two of the consecutive segments, in order to operate the two of the consecutive segments simultaneously, are connected to each other, to a central controlling device, or to each other and the central controlling device,
   wherein, the line sections, when the segment is controlled by the controller, form, if viewed in the direction of travel, a repeating sequence of phases of the alternating current in each of the consecutive segments and the order of the repeating sequence of phases is the same in each of the consecutive segments, and wherein,
   the controllers for the two of the consecutive segments, the central controlling device, or the controllers for the two of the consecutive segments and the central controlling device are/is configured so that the repeating sequence of phases continues from one segment of the two of the consecutive segments to the consecutive segment of the two of the consecutive segments across the transition zone.

2. The system of claim 1, wherein the system is adapted to synchronize the assigned controllers for the two of the consecutive segments in a manner so that an electromagnetic field produced by the two of the consecutive segments forms a magnetic wave which moves in or opposite to the direction of travel of the vehicle, the wave being continuous in the transition zone.

3. The system of claim 1, wherein, if viewed in the direction of travel from a first of the two consecutive segments to a second of the two consecutive segments, a line section of the first consecutive segment follows a line section of the second consecutive segment in the repeating sequence of phases of the alternating current.

4. The system of claim 1, wherein the line sections are connected to each other via connecting sections, which at least partly extend in the direction of travel, so that each of the alternating current lines follow a meandering path in the direction of travel in which the connecting sections are located alternating on opposite sides of the conductor arrangement, and wherein the line sections of the phases of the repeating sequence are formed by the meandering paths of the alternating current lines in the following manner:
   the line section of a first phase of the alternating current extends from a first side of the conductor arrangement towards a second side of the conductor arrangement, which is the side opposite to the first side of the conductor arrangement,
   the line section of a second phase of the alternating current, which follows the first phase in the order of phases, extends from the second side of the conductor arrangement towards the first side of the conductor arrangement, the line section of a third phase of the alternating current, which follows the second phase in the order of phases, extends from the first side of the conductor arrangement towards the second side of the conductor arrangement, if there are more than three phases, the line section(s) of the next phase or next phases in the order of phases extend(s) in the opposite direction between the first and second side of the conductor arrangement compared to the line section of the preceding phase, until the last phase is reached.

5. The system of claim 1, wherein the vehicle is a track bound vehicle or a road automobile.

6. A method of operating a system for transferring electric energy to a vehicle, comprising the steps of:

electrically connecting a plurality of consecutive segments of an electric conductor arrangement in parallel to each other and to a current supply, each segment having a transition zone between adjacent segments, generating an alternating electromagnetic field with a plurality of line sections comprised of at least three alternating current lines per segment for carrying phases of a multi-phase alternating current, which line sections extend transversely to the direction of travel of the vehicle, electrically connecting a controller for each segment adapted to control the operation of the segment independently of the other segments with a controller for a consecutive segment adapted to control the operation of the consecutive segment independently of the other segments and/or with a central controlling device adapted to simultaneously control the operation of consecutive segments, controlling, with the controllers for each segment and the central controlling device, a repeating sequence of phases of the alternating current, generated by the line sections, such that the order of the phases is the same in each line section and the repeating sequence of phases continues from one segment to the consecutive segment, wherein the order of the phases is the same in at least two consecutive segments and in each transition zone.

7. The method of claim 6, further comprising the step of synchronizing the assigned controllers for two of the consecutive segments so that the electromagnetic field produced by the two of the consecutive segments forms a magnetic wave which moves in or opposite to the direction of travel of the vehicle, the wave being continuous in the transition zone of the consecutive segments.

8. The method of claim 6, wherein the vehicle is a track bound vehicle or a road automobile.

9. The method of claim 6, further comprising the step of connecting the line sections to each other via connecting sections, which at least partly extend in the direction of travel, so that each of the alternating current lines follows a meandering path in the direction of travel in which the connecting sections are located alternating on opposite sides of the conductor arrangement, and wherein the line sections of the phases of the repeating sequence are formed by the meandering paths of the alternating current lines in the following manner:

extending the line section of a first phase of the alternating current from a first side of the conductor arrangement towards a second side of the conductor arrangement, which is the side opposite to the first side of the conductor arrangement, extending the line section of a second phase of the alternating current, which follows the first phase in the order of phases, from the second side of the conductor arrangement towards the first side of the conductor arrangement, extending the line section of a third phase of the alternating current, which follows the second phase in the order of phases, from the first side of the conductor arrangement towards the second side of the conductor arrangement, extending, if there are more than three phases, the line section(s) of the next phase or next phases in the order of phases in the opposite direction between the first and second side of the conductor arrangement compared to the line section of the preceding phase, until the last phase is reached.

10. A method of manufacturing a system for transferring electric energy to a vehicle, comprising the steps of:

providing an electric conductor arrangement comprised of a plurality of consecutive segments, each segment having a plurality of line sections comprised of at least three alternating current lines per segment for carrying phases of a multi-phase alternating current, which line sections extend transversely to the direction of travel of the vehicle, electrically connecting consecutive segments of the electric conductor arrangement in parallel to each other and to a current supply, each segment having a transition zone between adjacent segments, combining each segment with an assigned controller adapted to control the operation of the segment independently of the other segments, connecting the controllers of at least two consecutive segments, which follow each other in the direction of travel of the vehicle, or which follow each other opposite to the direction of travel, to each other, to a central controlling device, or to each other and a central controlling device so that the at least two consecutive segments can be operated at the same time, wherein the sections form, when the segment is controlled by the controller, if viewed in the direction of travel, a repeating sequence of phases of the alternating current and the order of the repeating sequence of phases is the same in each line section, and wherein, the controllers of at least two consecutive segments and the central controlling device are configured so that the repeating sequence of phases continues from one segment to the consecutive segment, wherein the order of the phases is the same in at least two consecutive segments and in each transition zone.

11. The method of claim 10, further comprising the step of synchronizing the assigned controllers of the at least two consecutive segments so that the electromagnetic field produced by the at least two consecutive segments forms a magnetic wave which moves in or opposite to the direction of travel of the vehicle, the wave being continuous in the transition zone of the consecutive segments.

12. The method of claim 10, further comprising the step of laying the alternating current lines of the at least two consecutive segments so that, if viewed in the direction of travel from a first of the two consecutive segments to a second of the two consecutive segments, a transversely extending section of the first consecutive segment follows a transversely extending section of the second consecutive segment in the repeating sequence of phases of the alternating current.

13. The method of claim 10, further comprising the steps of connecting the line sections to each other via connecting sections, which at least partly extend in the direction of travel, so that each of the alternating current lines follows a meandering path in the direction of travel in which the connecting sections are located alternating on opposite sides of the conductor arrangement, and wherein the line sections of the phases of the repeating sequence are formed by the meandering paths of the alternating current lines in the following manner:

- extending the line section of a first phase of the alternating current from a first side of the conductor arrangement towards a second side of the conductor arrangement, which is the side opposite to the first side of the conductor arrangement,
- extending the line section of a second phase of the alternating current, which follows the first phase in the order of phases, from the second side of the conductor arrangement towards the first side of the conductor arrangement,
- extending the line section of a third phase of the alternating current, which follows the second phase in the order of phases, from the first side of the conductor arrangement towards the second side of the conductor arrangement,
- extending, if there are more than three phases, the line section(s) of the next phase or next phases in the order of phases in the opposite direction between the first and second side of the conductor arrangement compared to the line section of the preceding phase, until the last phase is reached.

14. The method of claim 10, wherein the vehicle is a track bound vehicle or a road automobile.

* * * * *